(12) United States Patent
Li et al.

(10) Patent No.: US 10,757,442 B2
(45) Date of Patent: Aug. 25, 2020

(54) PARTIAL RECONSTRUCTION BASED TEMPLATE MATCHING FOR MOTION VECTOR DERIVATION

(71) Applicant: QUALCOMM Incorporated, San Diego, CA (US)

(72) Inventors: Xiang Li, Los Gatos, CA (US); Cheng-Teh Hsieh, Del Mar, CA (US); Jianle Chen, San Diego, CA (US); Kai Zhang, San Diego, CA (US); Hsiao-Chiang Chuang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 62 days.

(21) Appl. No.: 16/024,032

(22) Filed: Jun. 29, 2018

(65) Prior Publication Data
US 2019/0014342 A1  Jan. 10, 2019

Related U.S. Application Data

(60) Provisional application No. 62/528,918, filed on Jul. 5, 2017.

(51) Int. Cl.
*H04N 19/176* (2014.01)
*H04N 19/52* (2014.01)
(Continued)

(52) U.S. Cl.
CPC ......... *H04N 19/577* (2014.11); *H04N 19/105* (2014.11); *H04N 19/159* (2014.11);
(Continued)

(58) Field of Classification Search
CPC .... H04N 19/51; H04N 19/176; H04N 19/577; H04N 19/117; H04N 19/147; H04N 19/159; H04N 19/573; H04N 19/583
See application file for complete search history.

(56) References Cited

U.S. PATENT DOCUMENTS

| | | | |
|---|---|---|---|
| 2010/0118940 A1* | 5/2010 | Yin | H04N 19/105 375/240.12 |
| 2011/0002388 A1* | 1/2011 | Karczewicz | H04N 19/51 375/240.15 |

(Continued)

FOREIGN PATENT DOCUMENTS

EP    2145482 A1    1/2010

OTHER PUBLICATIONS

Tu, A Novel Framework for Frame Rate Up Conversion by Predictive Variable Block-size Motion Estimated Optical Flow, 2009, IEEE (Year: 2009).*

(Continued)

*Primary Examiner* — Alison Slater
(74) *Attorney, Agent, or Firm* — Shumaker & Sieffert, P.A.

(57) ABSTRACT

A method of decoding video data includes determining, by a video decoder, a neighboring block in a current frame is inter coded. The method includes, in response to determining the neighboring block is inter coded, determining, by the video decoder, a template for a current block in the current frame based on a partial reconstruction of the neighboring block. The method includes determining, by the video decoder, a reference block in a reference frame corresponding to the template for the current block and determining, by the video decoder, motion vector information for the current frame based on the reference block and the template. The method includes generating, by the video decoder, a predictive block for the current block of video data based on the (Continued)

motion vector information and decoding, by the video decoder, the current block of video data based on the predictive block.

34 Claims, 24 Drawing Sheets

(51) Int. Cl.
    *H04N 19/82*     (2014.01)
    *H04N 19/577*     (2014.01)
    *H04N 19/44*     (2014.01)
    *H04N 19/105*     (2014.01)
    *H04N 19/159*     (2014.01)
    *H04N 19/583*     (2014.01)
    *H04N 19/55*     (2014.01)
    *H04N 19/593*     (2014.01)
    *H04N 19/13*     (2014.01)
    *H04N 19/61*     (2014.01)
    *H04N 19/126*     (2014.01)

(52) U.S. Cl.
    CPC .......... *H04N 19/176* (2014.11); *H04N 19/44* (2014.11); *H04N 19/52* (2014.11); *H04N 19/55* (2014.11); *H04N 19/583* (2014.11); *H04N 19/593* (2014.11); *H04N 19/82* (2014.11); *H04N 19/126* (2014.11); *H04N 19/13* (2014.11); *H04N 19/61* (2014.11)

(56) References Cited

U.S. PATENT DOCUMENTS

| | | | | |
|---|---|---|---|---|
| 2012/0183069 | A1* | 7/2012 | Peng | H04N 19/583 375/240.16 |
| 2015/0163509 | A1* | 6/2015 | Hsu | H04N 19/583 375/240.16 |
| 2017/0347128 | A1* | 11/2017 | Panusopone | H04N 19/174 |
| 2019/0037213 | A1* | 1/2019 | Hermansson | H04N 19/157 |
| 2019/0166370 | A1* | 5/2019 | Xiu | H04N 19/176 |

OTHER PUBLICATIONS

Chen J., et al., "Algorithm Description of Joint Exploration Test Model 6 (JEM 6)," Joint Video Exploration Team, JVET-F1001-v2, Mar. 31-Apr. 7 2017, 48 pages.

Chien W-J et al., "TE1: Decoder-side motion vector derivation report from Qualcomm", 15-21, 2. JCT-VC Meeting, Jul. 21, 2010-Jul. 28, 2010, Geneva, (Joint Collaborative Team on Video Coding of ISO/IEC JTC1/SC29/WG11 and ITU-T SG.16 ), URL: http://wftp3.itu.int/av-arch/jctvc-site/, Jul. 23, 2010 (Jul. 23, 2010), XP030007677, p. 1 (3 pp).

Chuang; et al., "A block-based design for Bi-directional optical flow (BIO)," Joint Video Exploration Team (JVET) of ITU-T SG 16 WP 3 and ISO/IEC JTC 1/SC 29/WG 11; 6th Meeting: Hobard, AU, Mar. 31-Apr. 7, 2017, JVET-F0022, Mar. 15, 2017, 3 pages.

Guo L., et al., "CE2: Overlapped Block Motion Compensation", 98, MPEG Meeting; Nov. 28, 2011-Dec. 2, 2011; Geneva; (Motion Picture Expert Group of ISO/IEC JTC1/SC29/WG11),, No. m22319, Nov. 18, 2011 (Nov. 18, 2011), XP030050882 (8 pp).

International Search Report and Written Opinion—PCT/US2018/040584—ISA/EPO—dated Sep. 25, 2018 (18 pp).

Kamp et al., "Decoder Side Motion Vector Derivation," PowerPoint slides, VCEG-AG16, 33'd Meeting, Shenzhen, China, International Telecommunication Union (Oct. 2007) (24 pp).

Kamp S., et al., "Description of video coding technology proposal by RWTH Aachen University [online]," JCTVC-A112, Apr. 15, 2010, 23 Pages, URL,http://wftp3.itu.int/av-arch/jctvc-site/2010_04_A_Dresden/JCTVC-A112.doc.

Chen J., et al., "Algorithm Description of Joint Exploration Test Model 6 {Jem 6)," Joint Video Exploration Team {JVET) of ITU-T SG 16 WP 3 and ISO/IEC JTC 1/SC 29/WG 11, 6th Meeting; Hobart, AU, Mar. 31-Apr. 7, 2017, Document: JVET-F1001-v3, Jun. 30, 2017, 48 pp.

Alshin A., et al., "EE3: Bi-directional Optical Flow w/o Block Extension", 5th JVET Meeting; Jan. 12, 2017-Jan. 20, 2017; Geneva; (The Joint Video Exploration Team of ISO/IEC JTC1/SC29/WG11 and ITU-T SG.16); URL: http://phenix.int-evry.fr/jvet/,,no.JVET-E0028, Jan. 3, 2017, XP030150490, 4 pages.

Sullivan et al., "Overview of the High Efficiency Video Coding (HEVC) Standard," IEEE Transactions on Circuits and Systems for Video Technology, vol. 22, No. 12, Dec. 2012, pp. 1649-1668.

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

International Preliminary Report on Patentability—PCT/US2018/040584 —ISA/EPO—dated Jan. 16, 2020 (11 pp).

\* cited by examiner

PARTIAL RECONSTRUCTION BASED TEMPLATE MATCHING FOR MOTION VECTOR DERIVATION

This Application claims the benefit of U.S. Provisional Patent Application 62/528,918, filed on Jul. 5, 2017, the entire content of which is hereby incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture may be encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to decoder-side motion vector derivation (DMVD). These techniques of this disclosure may be applied to any of the existing video codecs, such as HEVC (High Efficiency Video Coding), and/or may be an efficient coding tool in any future video coding standards. More particularly, this disclosure describes techniques related to applying template matching using a partial reconstruction of a neighboring block.

In one example, a method of decoding video data includes: determining, by a video decoder implemented in processing circuitry, a neighboring block in a current frame is inter coded; in response to determining the neighboring block is inter coded, determining, by the video decoder, a template for a current block in the current frame based on a partial reconstruction of the neighboring block; determining, by the video decoder, a reference block in a reference frame corresponding to the template for the current block, wherein the reference frame is different from the current frame; determining, by the video decoder, motion vector information for the current frame based on the reference block and the template; generating, by the video decoder, a predictive block for the current block of video data based on the motion vector information; and decoding, by the video decoder, the current block of video data based on the predictive block.

In another example, a device for decoding video data includes a memory configured to store the video data and one or more processors. The one or more processors are configured to: determine a neighboring block in a current frame is inter coded; in response to determining the neighboring block is inter coded, determine a template for a current block in the current frame based on a partial reconstruction of the neighboring block; determine a reference block in a reference frame corresponding to the template for the current block, wherein the reference frame is different from the current frame; determine motion vector information for the current frame based on the reference block and the template; generate a predictive block for the current block of video data based on the motion vector information; and decode the current block of video data based on the predictive block.

In another example, a non-transitory computer-readable computer readable medium is configured with one or more instructions that, when executed, cause one or more processors to: determine a neighboring block in a current frame is inter coded; in response to determining the neighboring block is inter coded, determine a template for a current block in the current frame based on a partial reconstruction of the neighboring block; determine a reference block in a reference frame corresponding to the template for the current block, wherein the reference frame is different from the current frame; determine motion vector information for the current frame based on the reference block and the template; generate a predictive block for the current block of video data based on the motion vector information; and decode the current block of video data based on the predictive block.

In another example, a device comprises means for determining a neighboring block in a current frame is inter coded; means for determining a template for a current block in the current frame based on a partial reconstruction of the neighboring block in response to determining the neighboring block is inter coded; means for determining a reference block in a reference frame corresponding to the template for the current block, wherein the reference frame is different from the current frame; means for determining motion vector information for the current frame based on the reference block and the template; means for generating a predictive block for the current block of video data based on the motion vector information; and means for decoding the current block of video data based on the predictive block.

In another example, a method of encoding video data includes: determining, by a video encoder implemented in processing circuitry, a neighboring block in a current frame is inter coded; in response to determining the neighboring block is inter coded, determining, by the video encoder, a template for a current block in the current frame based on a partial reconstruction of the neighboring block; determining, by the video encoder, a reference block in a reference frame corresponding to the template for the current block, wherein the reference frame is different from the current frame; determining, by the video encoder, motion vector information for the current frame based on the reference block and the template; generating, by the video encoder, a predictive block for the current block of video data based on the motion vector information; and generating, by the video encoder, residual sample values for the current block of video data based on the predictive block.

In another example, a device for encoding video data includes a memory configured to store the video data and one or more processors. The one or more processors are configured to: determine a neighboring block in a current frame is inter coded; in response to determining the neighboring block is inter coded, determine a template for a current block in the current frame based on a partial reconstruction of the neighboring block; determine a reference block in a reference frame corresponding to the template for the current block, wherein the reference frame is different from the current frame; determine motion vector information for the current frame based on the reference block and the template; generate a predictive block for the current block of video data based on the motion vector information; and generate residual sample values for the current block of video data based on the predictive block.

In another example, a non-transitory computer-readable medium is configured with one or more instructions that, when executed, cause one or more processors to: determine a neighboring block in a current frame is inter coded; in response to determining the neighboring block is inter coded, determine a template for a current block in the current frame based on a partial reconstruction of the neighboring block; determine a reference block in a reference frame corresponding to the template for the current block, wherein the reference frame is different from the current frame; determine motion vector information for the current frame based on the reference block and the template; generate a predictive block for the current block of video data based on the motion vector information; and generate residual sample values for the current block of video data based on the predictive block.

In another example, a device includes means for determining a neighboring block in a current frame is inter coded; means for determining a template for a current block in the current frame based on a partial reconstruction of the neighboring block in response to determining the neighboring block is inter coded; means for determining a reference block in a reference frame corresponding to the template for the current block, wherein the reference frame is different from the current frame; means for determining motion vector information for the current frame based on the reference block and the template; means for generating a predictive block for the current block of video data based on the motion vector information; and means for generating residual sample values for the current block of video data based on the predictive block.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

In general, the techniques of this disclosure are related inter prediction and motion vector derivation for video coding. More specifically, the techniques of this disclosure are related to template matching based motion vector derivation. The techniques of this disclosure may be applied, alone or in any combination, to any of the existing video codecs, such as HEVC (High Efficiency Video Coding) or be an efficient coding tool in any future video coding standards.

Some video coders (e.g., a video decoder, a video encoder, etc.) apply template matching using a full reconstruction of a neighboring block. For example, a video decoder may derive motion vector information for the neighboring block, generate samples for the neighboring block using the motion vector information and residual sample values (e.g., residues) for the neighboring block, and apply bi-directional optical flow (BIO) and Overlapped Block Motion Compensation (OBMC) techniques to the samples to generate a full reconstruction of the neighboring block. In this example, after generating the full reconstruction of the neighboring block, such video coders may begin to apply template matching to a current block using the full reconstruction of the neighboring block.

Rather than necessarily waiting to generate a full reconstruction of a neighboring block, techniques herein describe a video coder (e.g., a video decoder, a video encoder, etc.) configured to apply template matching to code (e.g., decode, encode, etc.) a current block of video data using a partial reconstruction of the neighboring block. As used herein, a partial reconstruction of the neighboring block may refer to a reconstruction of the neighboring block that is before further processing steps (e.g., BIO, OBMC, etc.) have been initiated and/or completed to generate a full reconstruction of the neighboring block. These further processing steps may, for example, occur after locating one or more prediction blocks in reference pictures but before any sort of loop filtering is applied. In some examples, the partial reconstruction of the neighboring block may indicate pixel values that are different than the full reconstruction of the neighboring block. For example, a video decoder may derive motion vector information for the neighboring block and generate a partial reconstruction of the neighboring block using the motion vector information (and residual sample values for the neighboring block). In this example, in parallel with or before applying BIO and OBMC techniques to the samples for the neighboring block, the video decoder applies template matching to a current block using the partial reconstruction of the neighboring block. In this way, the video decoder may remove undesirable delay in initiating reconstruction of blocks of video data when applying template matching techniques, which may reduce a power usage by video coders.

Figure 1:
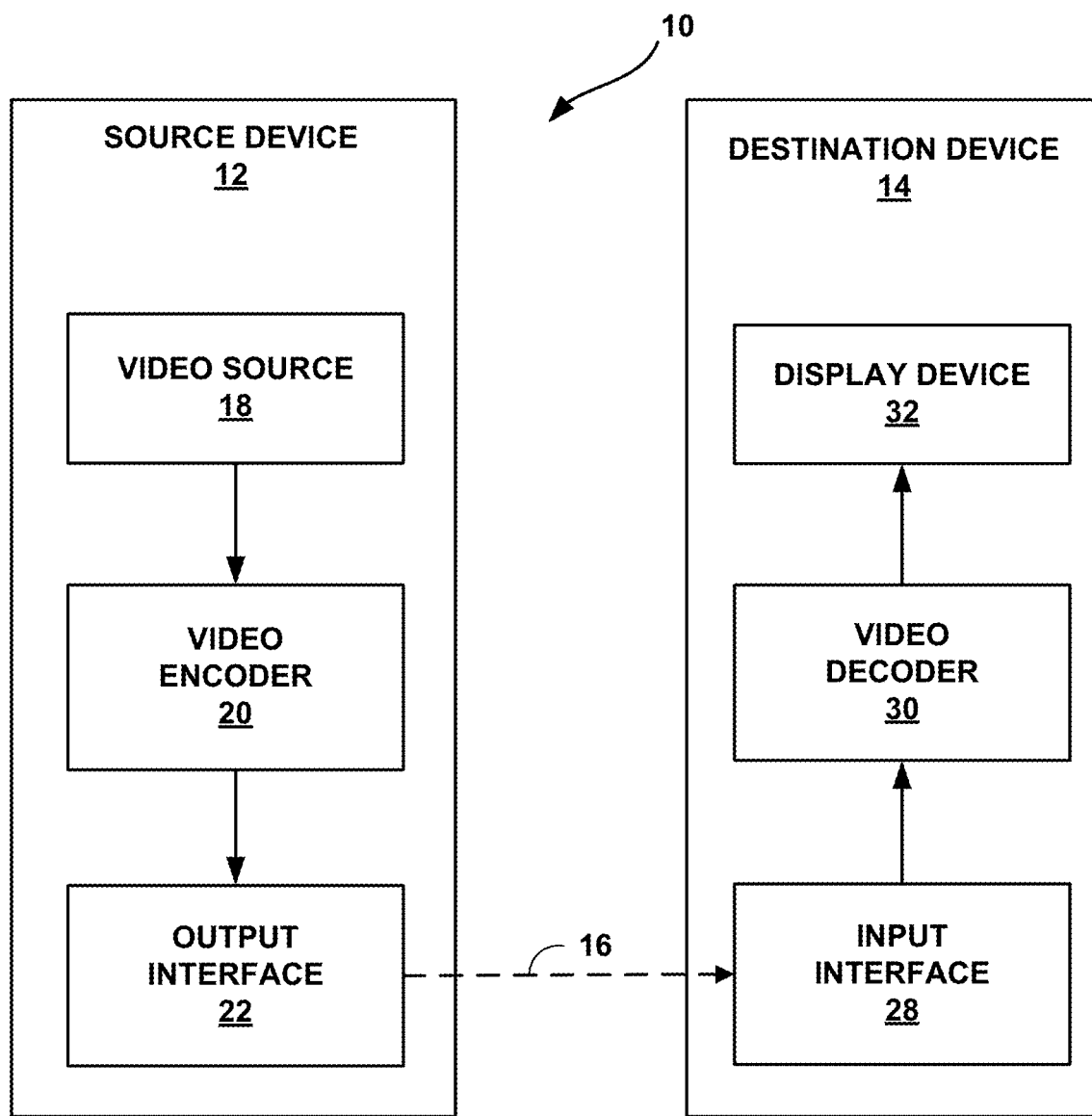
FIG. 1 is a block diagram illustrating an example video encoding and decoding system that may utilize techniques for template matching using a partial reconstruction of a neighboring block.

FIG. 1 is a block diagram illustrating an example video encoding and decoding system 10 that may utilize techniques for template matching using a partial reconstruction of a neighboring block. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may include any type of medium or device capable of moving the encoded video data from source device 12 to destination device 14. In one example, computer-readable medium 16 may include a communication medium to enable source device 12 to transmit encoded video data directly to destination device 14 in real-time. The encoded video data may be modulated according to a communication standard, such as a wireless communication protocol, and transmitted to destination device 14. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for bi-directional optical flow. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for bi-directional optical flow may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of the video data. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as HEVC, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC) or ITU-T H.265, which may include one or more techniques described in G. J. Sullivan, J.-R. Ohm, W.-J. Han, T. Wiegand "Overview of the High Efficiency Video Coding (HEVC) Standard," IEEE Transactions on Circuits and Systems for Video Technology, vol. 22, no. 12. pp. 1649-1668, December, 2012, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC specification, and referred to as HEVC V4 (12/2016) hereinafter, is available from http://handle.itu.int/11.1002/1000/12905. ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 6 (JEM-6) could be downloaded from: https://jvet.hhi.fraunhofer.de/svn/svn_HMJEMSoftware/tags/HM-16.6-JEM-6.0/. Algorithm description of Joint Exploration Test Model 6 (JEM-6) could be referred to by J. Chen, E. Alshina, G. J. Sullivan, J.-R. Ohm, J. Boyce, "Algorithm description of Joint Exploration Test Model 6 (JEM6)", JVET-F1001, April 2017.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoders typically perform video decoding as part of the processes of determining how to encode video data.

In HEVC and other video coding specifications, a video sequence typically includes a series of pictures. Pictures may also be referred to as "frames." A picture may include three sample arrays, denoted SL, SCb, and Scr. SL is a two-dimensional array (i.e., a block) of luma samples. SCb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

A CTB contains a quad-tree the nodes of which are coding units. The size of a CTB can be ranges from 16×16 to 64×64 in the HEVC main profile (although technically 8×8 CTB sizes can be supported). A CU could be the same size of a CTB although and as small as 8×8. Each coding unit is coded with one mode. When a CU is inter coded, it may be further partitioned into 2 or 4 prediction units (PUs) or become just one PU when further partitioning does not apply. When two PUs are present in one CU, they can be half size rectangles or two rectangle size with ¼ or ¾ size of the CU.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU. When the CU is inter coded, one set of motion information may be present for each PU. In addition, each PU may be coded with a unique inter-prediction mode to derive the set of motion information.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of network abstraction layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for supplemental enhancement information (SEI) messages, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In accordance with the techniques of this disclosure, video encoder 20 and/or video decoder 30 may further perform template matching (and BIO techniques) during motion compensation as discussed in greater detail below.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may include an integrated circuit, a microprocessor, and/or a wireless communication device, such as a cellular telephone.

Figure 2:
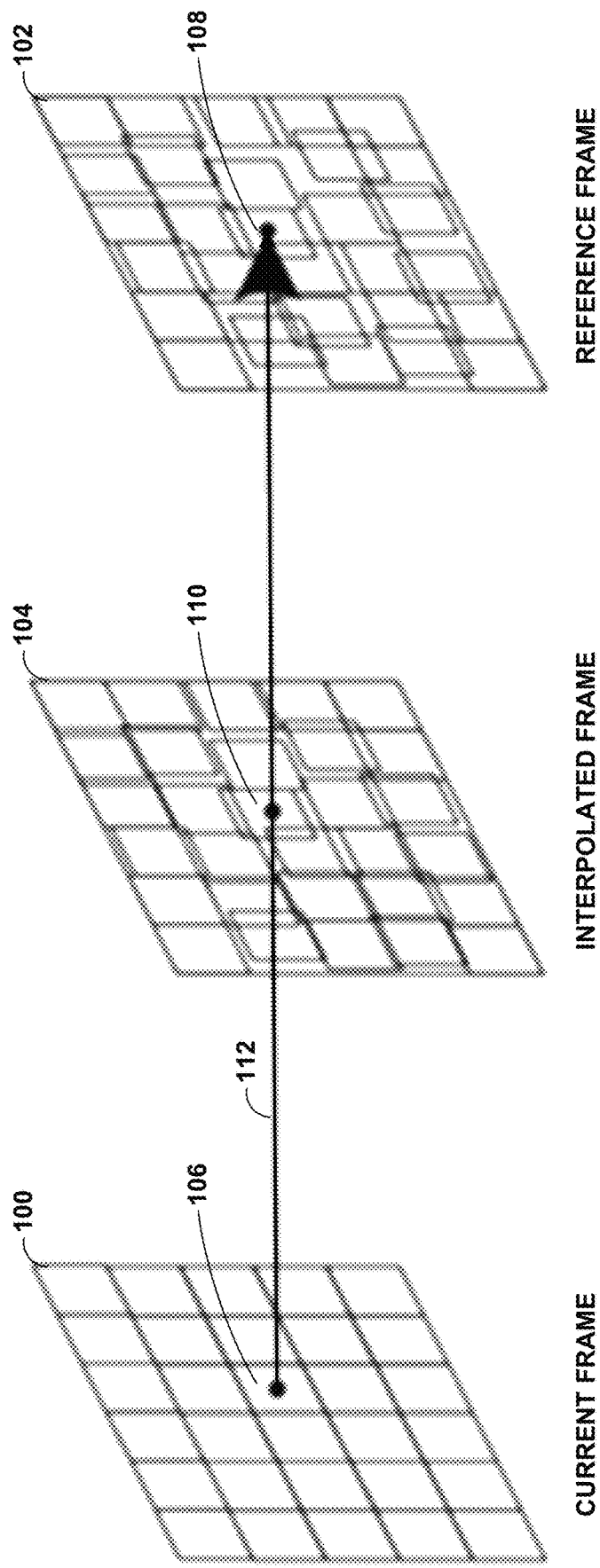
FIG. 2 is a conceptual diagram illustrating an example of unilateral motion estimation (ME) as a block-matching algorithm (BMA) performed for motion compensated frame-rate up-conversion (MC-FRUC).

FIG. 2 is a conceptual diagram illustrating an example of unilateral motion estimation (ME) as a block-matching algorithm (BMA) performed for motion compensated frame-rate up-conversion (MC-FRUC). In general, a video coder (such as video encoder 20 or video decoder 30) performs unilateral ME to obtain motion vectors (MVs), such as MV 112, by searching for the best matching block (e.g., reference block 108) from reference frame 102 for current block 106 of current frame 100. Then, the video coder interpolates an interpolated block 110 along the motion trajectory of motion vector 112 in interpolated frame 104. That is, in the example of FIG. 2, motion vector 112 passes through midpoints of current block 106, reference block 108, and interpolated block 110.

As shown in FIG. 2, three blocks in three frames are involved following the motion trajectory. Although current block 106 in current frame 100 belongs to a coded block, the best matching block in reference frame 102 (that is, reference block 108) need not fully belong to a coded block (that is, the best matching block might not fall on a coded block boundary, but instead, may overlap such a boundary). Likewise, interpolated block 110 in interpolated frame 104 need not fully belong to a coded block. Consequently, overlapped regions of the blocks and un-filled (holes) regions may occur in interpolated frame 104.

To handle overlaps, simple FRUC algorithms merely involve averaging and overwriting the overlapped pixels. Moreover, holes may be covered by the pixel values from a reference or a current frame. However, these algorithms may result in blocking artifacts and blurring. Hence, motion field segmentation, successive extrapolation using the discrete Hartley transform, and image inpainting may be used to handle holes and overlaps without increasing blocking artifacts and blurring.

Figure 3:
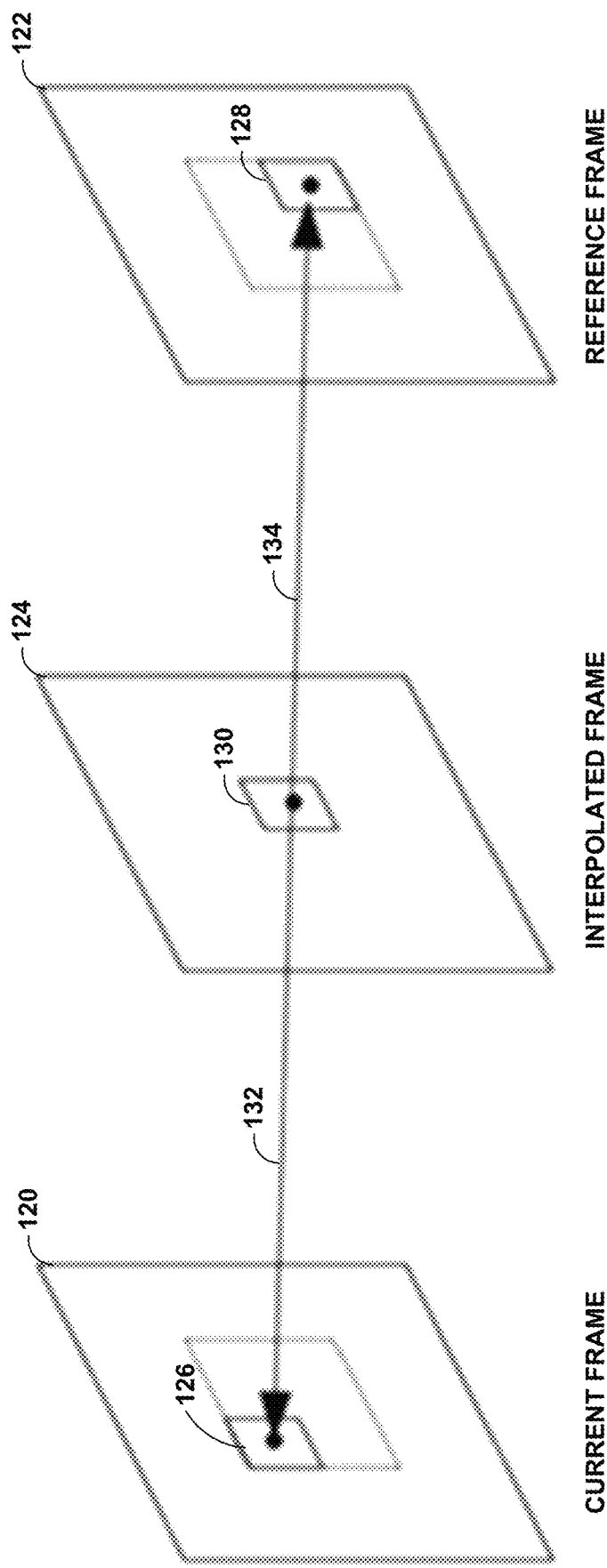
FIG. 3 is a conceptual diagram illustrating an example of bilateral ME as a BMA performed for MC-FRUC.

FIG. 3 is a conceptual diagram illustrating an example of bilateral ME as a BMA performed for MC-FRUC. Bilateral ME is another solution (in MC-FRUC) that can be used to avoid the problems caused by overlaps and holes. A video coder (such as video encoder 20 and/or video decoder 30) performing bilateral ME obtains MVs 132, 134 passing through interpolated block 130 of interpolated frame 124 (which is intermediate to current frame 120 and reference frame 122) using temporal symmetry between current block 126 of current frame 120 and reference block 128 of reference frame 122. As a result, the video coder does not generate overlaps and holes in interpolated frame 124. Since it is assumed that current block 126 is a block that the video coder processes in a certain order, e.g., as in the case of video coding, a sequence of such blocks would cover the whole intermediate picture without overlap. For example, in the case of video coding, blocks can be processed in the decoding order. Therefore, such a method may be more suitable if FRUC ideas can be considered in a video coding framework.

S. F. Tu, O. C. Au, Y. Wu, E. Luo and C.-H. Yeun, "A Novel Framework for Frame Rate Up Conversion by Predictive Variable Block-Size Motion Estimated Optical Flow," International Congress on Image Signal Processing (CISP), 2009 described a hybrid block-level motion estimation and pixel-level optical flow method for frame rate up-conversion.

In the HEVC standard, there are two inter prediction modes, named merge (with skip mode considered as a special case of merge) and advanced motion vector prediction (AMVP) modes respectively for a PU. In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

A merge candidate corresponds to a full set of motion information while an AMVP candidate contains just one motion vector for a specific prediction direction and reference index. The candidates for both modes are derived similarly from the same spatial and temporal neighboring blocks.

Figure 4B:
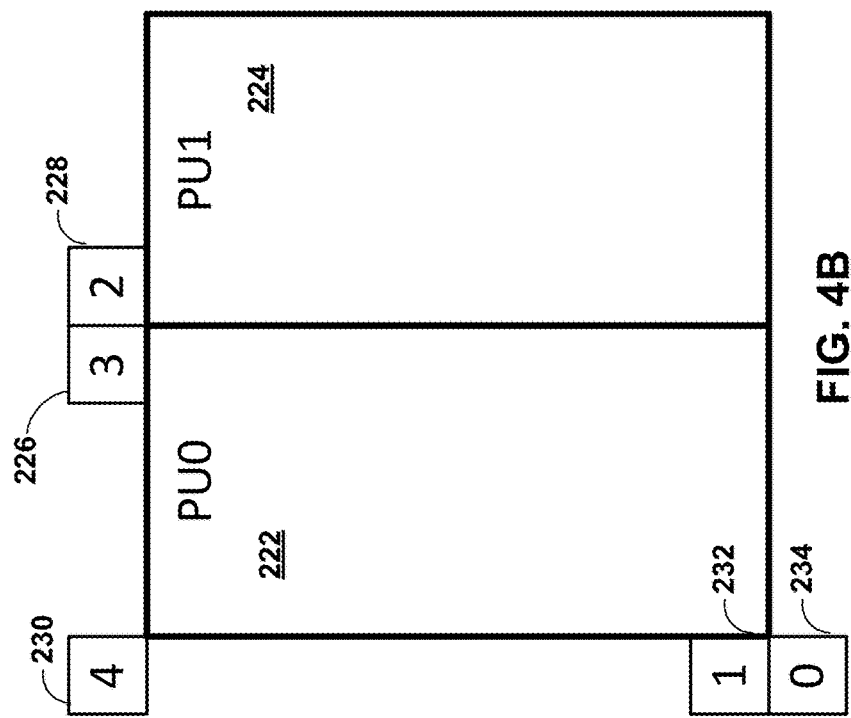
FIG. 4B is a conceptual diagram illustrating spatial neighboring MV candidates for AMVP modes.
Figure 4A:
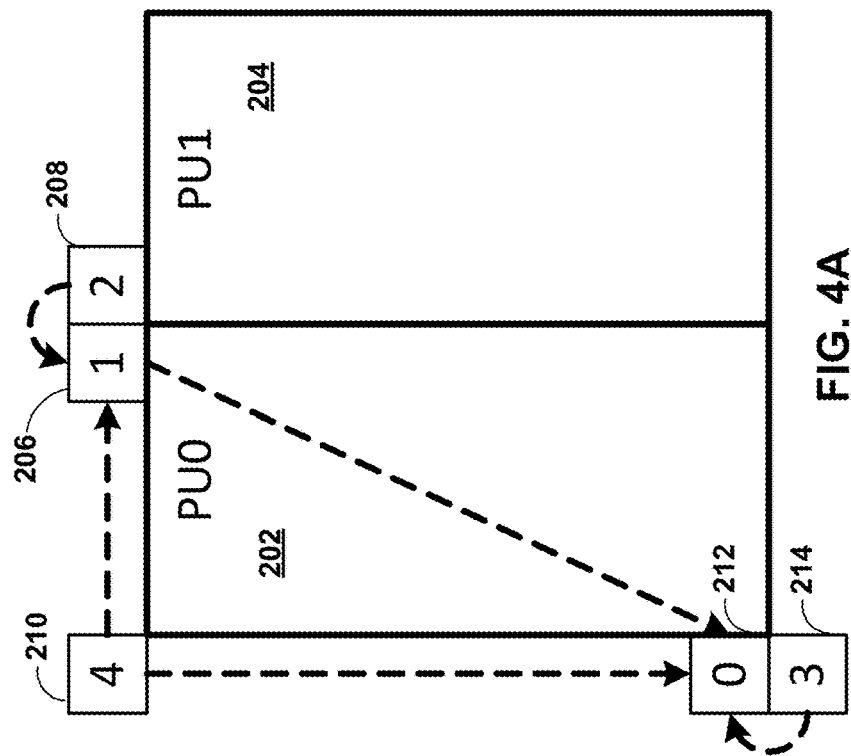
FIG. 4A is a conceptual diagram illustrating spatial neighboring motion vector (MV) candidates for merge mode.

FIGS. 4A and 4B are conceptual diagrams illustrating spatial neighboring candidates in HEVC. In some examples, video encoder 20 and/or video decoder 30 may derive spatial MV candidates from the neighboring blocks, e.g., as shown in FIGS. 4A and 4B, for a specific PU (e.g., PU0 202 of FIG. 4A and PU0 222 of FIG. 4B, which are included in the same corresponding CUs as PU1 204 and PU1 224, respectively), although the methods for generating the candidates from the blocks differ for merge and AMVP modes. In merge mode, video encoder 20 and/or video decoder 30 may derive up to four spatial MV candidates according to the order shown in FIG. 4A with numbers, as follows: left (block 212), above (block 206), above right (block 208), below left (block 214), and above left (block 210).

In AVMP mode, video encoder 20 and/or video decoder 30 divide the neighboring blocks into two groups: left group (including blocks 232 and 234), and above group (including blocks 230, 226, and 228), as shown in FIG. 4B. For each group, video encoder 20 and/or video decoder 30 determines the potential candidate in a neighboring block referring to the same reference picture as that indicated by the signaled reference index that has the highest priority to form a final candidate of the group. It is possible that no neighboring blocks contain a motion vector pointing to the same reference picture. Therefore, if such a candidate cannot be found, video encoder 20 and/or video decoder 30 may scale the first available candidate to form the final candidate, and thus, the temporal distance differences can be compensated.

Figure 5B:
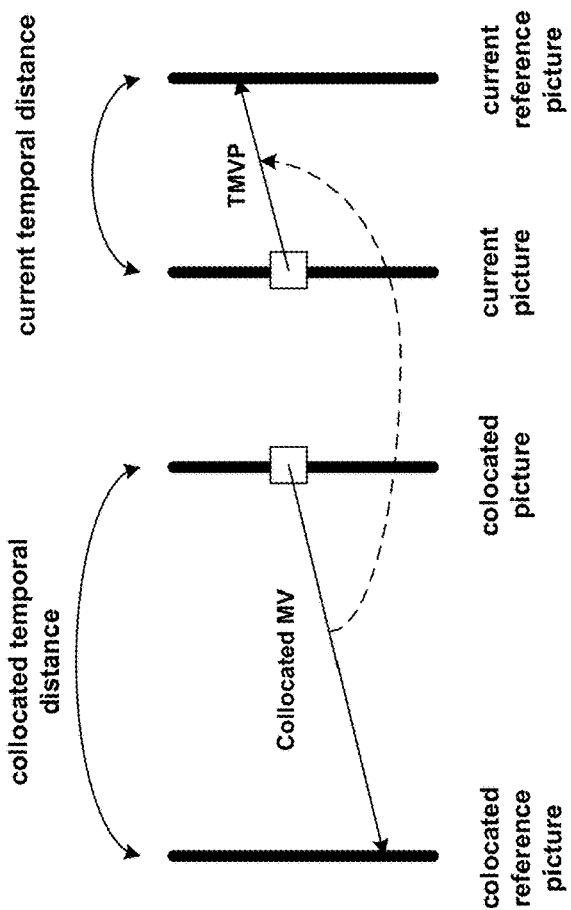
FIG. 5B is a conceptual diagram illustrating an example of MV scaling.
Figure 5A:
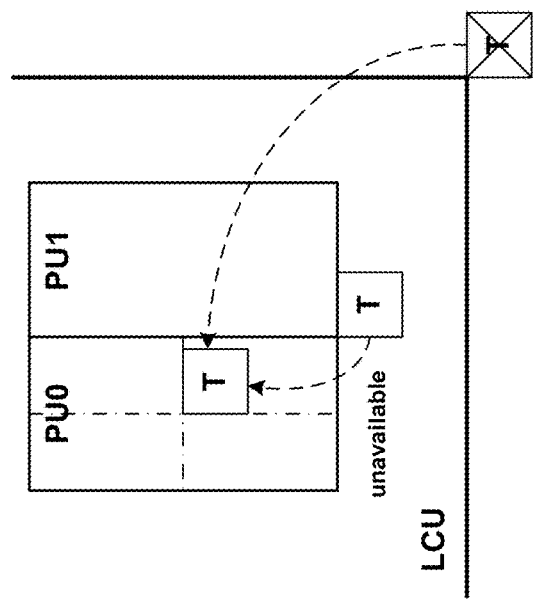
FIG. 5A is a conceptual diagram illustrating an example of a Temporal motion vector predictor (TMVP) candidate.

FIG. 5A shows an example of a TMVP candidate, and FIG. 5B shows an example of MV scaling. Temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

The primary block location for TMVP candidate derivation is the bottom right block outside of the collocated PU as shown in FIG. 5A as a block "T", to compensate the bias to the above and left blocks used to generate spatial neighboring candidates. However, if that block is located outside of the current CTB row or motion information is not available, the block is substituted with a center block of the PU.

Motion vector for TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV need to be scaled to compensate the temporal distance differences, as shown in FIG. 5B.

HEVC also utilizes motion vector scaling. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

HEVC also utilizes artificial motion vector candidate generation. If a motion vector candidate list is not complete, artificial motion vector candidates may be generated and inserted at the end of the list until the list is full. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

HEVC also utilizes a pruning process for candidate insertion. Candidates from different blocks may happen to be the same, which decreases the efficiency of a merge/AMVP candidate list. A pruning process is applied to solve this problem. It compares one candidate against the others in the current candidate list to avoid inserting identical candidate in certain extent. To reduce the complexity, only limited numbers of pruning process is applied instead of comparing each potential one with all the other existing ones.

Figure 6:
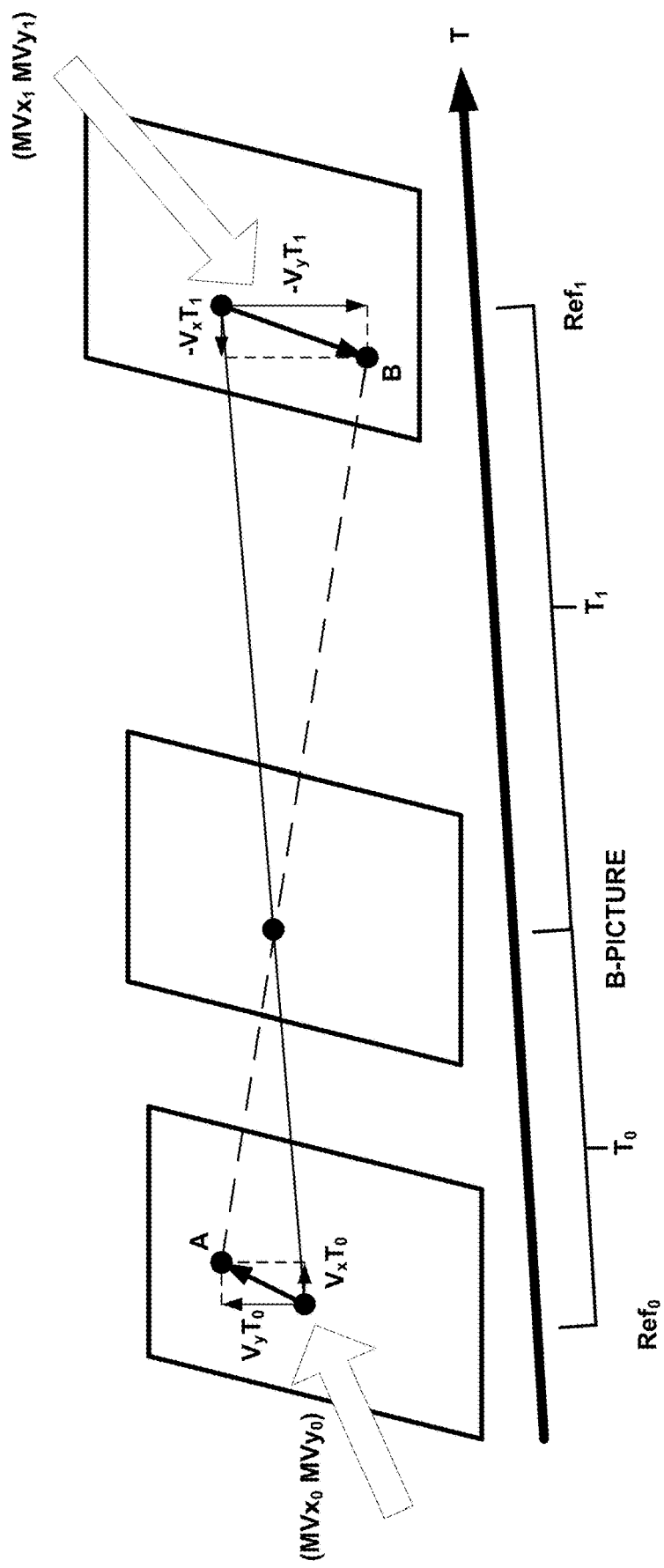
FIG. 6 is a conceptual diagram illustrating an example of optical flow trajectory.

Aspects of bi-directional optical flow in JEM will now be described. FIG. 6 shows an example of optical flow trajectory. BIO utilizes pixel-wise motion refinement which is performed on top of block-wise motion compensation in a case of bi-prediction. Because BIO compensates the fine motion can inside the block enabling BIO results in enlarging block size for motion compensation. Sample-level motion refinement does not require exhaustive search or signaling since there is an explicit equation which gives a refined motion vector for each sample.

Let $I^{(k)}$ be luminance value from reference k (k=0, 1) after compensation block motion, and $\partial I^{(k)}/\partial x$, $\partial I^{(k)}/\partial y$ are horizontal and vertical components of the $I^{(k)}$ gradient respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \tag{1}$$

Combining optical flow equation with Hermite interpolation for motion trajectory of each sample one gets a unique polynomial of third order which matches both function values $I^{(k)}$ and derivatives $\partial I^{(k)}/\partial x$, $\partial i^{(k)}/\partial y$ at the ends. The value of this polynomial at t=0 is BIO prediction:

$$\text{pred}_{BIO}=1/2 \cdot (I^{(0)}+I^{(1)}+v_x/2 \cdot (\tau_1 \partial I^{(1)}/\partial x - \tau_0 \partial I^{(0)}/\partial x)+v_y/2 \cdot (\tau_1 \partial I^{(1)}/\partial y - \tau_0 \partial I^{(0)}/\partial y)). \quad (2)$$

Here $\tau_0$, and $\tau_1$ denote the distance to reference frames as shown on a FIG. 6. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (both from the past or both from the future) then signs are different $\tau_0 \cdot \tau_1 < 0$. In this case BIO is applied only if prediction come not from the same time moment ($\tau_0 \neq \tau_1$), both referenced regions have non-zero motion ($MVx_0, MVy_0, MVx_1, MVy_1 \neq 0$) and block motion vectors are proportional to the time distance ($MVx_0/MVx_1 = MVy_0/MVy_1 = -\tau_0/\tau_1$).

The motion vector field $(v_x, v_y)$ is determined by minimizing the difference $\Delta$ between values in points A and B (intersection of motion trajectory and reference frame planes on FIG. 6). Model uses only first linear term of local Taylor expansion for $\Delta$:

$$\Delta=(I^{(0)}-I^{(1)}{}_0+v_x(\tau_1 \partial I^{(1)}/\partial x+\tau_0 \partial I^{(0)}/\partial x)+v_y(\tau_1 \partial I^{(1)}/\partial y+\tau_0 \partial I^{(0)}/\partial y)) \quad (3)$$

All values in (1) depend on sample location (i',j'), which was omitted so far. Assuming the motion is consistent in local surrounding, the $\Delta$ inside (2M+1)×(2M+1) square window $\Omega$ centered in currently predicted point (i,j) may be minimized:

$$(v_x, v_y) = \underset{v_x,v_y}{\mathrm{argmin}} \sum_{[i',j] \in \Omega} \Delta^2[i', j'] \quad (4)$$

For this optimization problem, a simplified solution making first minimization in vertical and then in horizontal directions may be used, which results in:

$$v_x = (s_1 + r) > m ? \mathrm{clip3}\left(-thBIO, thBIO, -\frac{s_3}{(s_1+r)}\right) : 0 \quad (5)$$

$$v_y = (s_5 + r) > m ? \mathrm{clip3}\left(-thBIO, thBIO, -\frac{s_6 - v_x s_2/2}{(s_5+r)}\right) : 0 \quad (6)$$

where, $$s_1 = \sum_{[i',j] \in \Omega} (\tau_1 \partial I^{(1)}/\partial x + \tau_0 \partial I^{(0)}/\partial x)^2; \quad (7)$$

$$s_3 = \sum_{[i',j] \in \Omega} (I^{(1)} - I^{(0)})(\tau_1 \partial I^{(1)}/\partial x + \tau_0 \partial I^{(0)}/\partial x);$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j] \in \Omega} (\tau_1 \partial I^{(1)}/\partial y + \tau_0 \partial I^{(0)}/\partial y)^2;$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

In order to avoid division by zero or very small value, regularization parameters r and m are introduced in equations (2), (3).

$$r=500 \cdot 4^{d-8} \quad (8)$$

$$m=700 \cdot 4^{d-8} \quad (9)$$

Here d is the internal bit-depth of the input video.

In some cases, MV regiment of BIO might be unreliable due to noise or irregular motion. Therefore, in BIO, the magnitude of MV regiment is clipped to the certain threshold (thBIO). The threshold value is determined based on whether all the reference pictures of the current picture are all from one direction. If all the reference pictures of the current pictures of the current picture are from one direction, the value of the threshold is set to $12 \times 2^{14-d}$, otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX,fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

Figure 7:
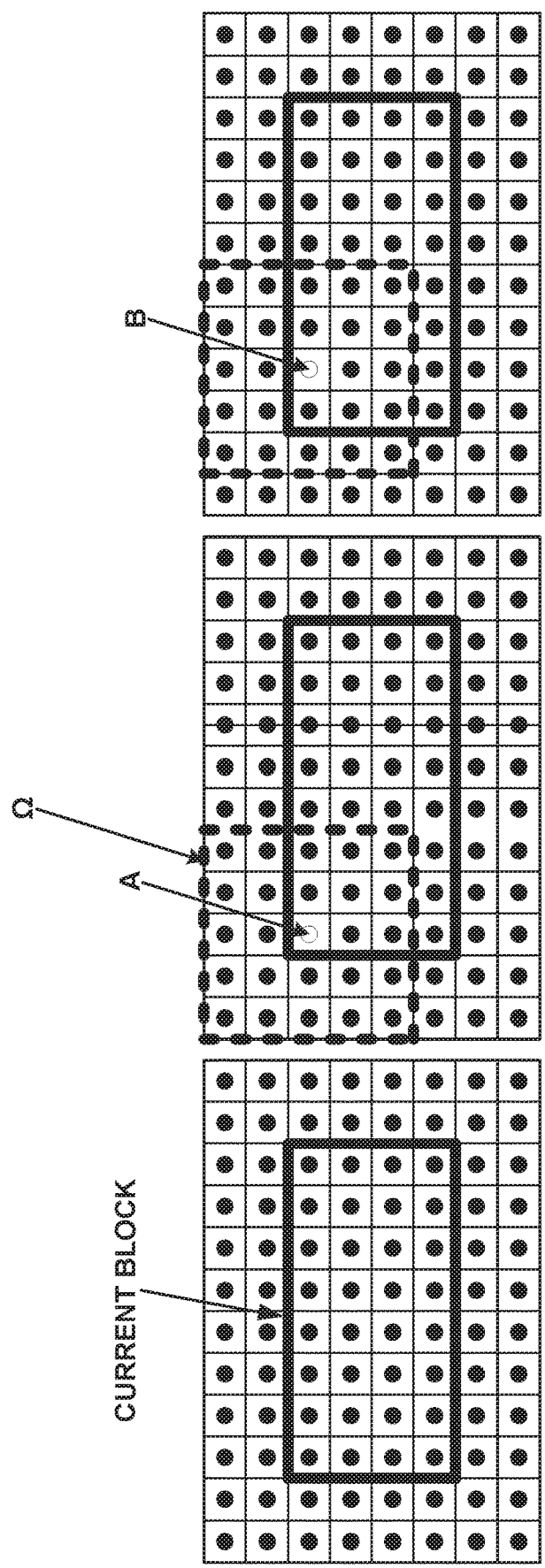
FIG. 7 is a conceptual diagram illustrating an example of bi-directional optical flow (BIO) for an 8×4 block.

FIG. 7 is a conceptual diagram illustrating an example of gradient calculation for an 8×4 block. For an 8×4 block, a video coder fetches the motion compensated predictors and calculates the horizontal/vertical (HOR/VER) gradients of all the pixels within a current block, as well as the outer two lines of pixels, because solving $v_x$ and $v_y$ for each pixel needs the HOR/VER gradient values and motion compensated predictors of the pixels within the window $\Omega$ centered in each pixel as shown in equation (4). And in one example of JEM, the size of this window is set to 5×5. Therefore, the video coder (e.g., video encoder 20 and/or video decoder 30) fetches the motion compensated predictors and calculates the gradients for the outer two lines of pixels around points A and B.

TABLE 1

Filters for gradients calculation in BIO

| Fractional pel position | Interpolation filter for gradient(BIOfilterG) |
| --- | --- |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |

TABLE 1-continued

Filters for gradients calculation in BIO

| Fractional pel position | Interpolation filter for gradient(BIOfilterG) |
|---|---|
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {1, −7, 38, 38, −7, 1} |

In examples of JEM, BIO is applied to all bi-directional predicted blocks when the two predictions are from different reference pictures. When local illumination compensation (LIC) is enabled for a CU, BIO is disabled.

Figure 8:
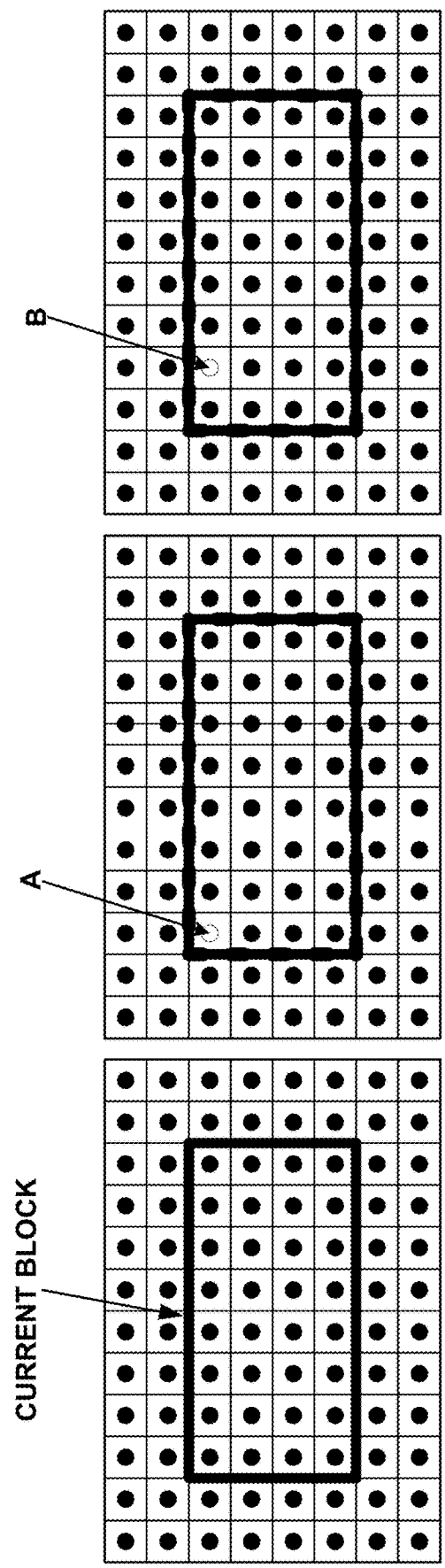
FIG. 8 is a conceptual diagram illustrating an example of modified BIO for an 8×4 block.

In 5th JVET meeting, a proposal JVET-E0028 is submitted to modify the BIO operations and reduce the memory access bandwidth. In this proposal, no motion compensated predictors and gradient values are needed for the pixels outside the current block. Moreover, the solving of $v_x$ and $v_y$ for each pixel is modified to using the motion compensated predictors and the gradient values of all the pixels within current block as shown in FIG. 8. In other words, the square window $\Omega$ in equation (4) is modified to a window which is equal to current block. Besides, a weighting factor w(i',j') is considered for deriving $v_x$ and $v_y$. The w(i',j') is a function of the position of the center pixel (i,j) and the positions of the pixels (I',j') within the window.

$$s_1 = \sum_{[i',j]\in\Omega} w(i', j')(\tau_1 \partial I^{(1)}/\partial x + \tau_0 \partial I^{(0)}/\partial x)^2; \quad (10)$$

$$s_3 = \sum_{[i',j]\in\Omega} w(i', j')(I^{(1)} - I^{(0)})(\tau_1 \partial I^{(1)}/\partial x + \tau_0 \partial I^{(0)}/\partial x);$$

$$s_2 = \sum_{[i',j]\in\Omega} w(i', j')$$

$$(\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j]\in\Omega} w(i', j')(\tau_1 \partial I^{(1)}/\partial y + \tau_0 \partial I^{(0)}/\partial y)^2;$$

$$s_6 = \sum_{[i',j]\in\Omega} w(i', j')(I^{(1)} - I^{(0)})(\tau_1 \partial I^{(1)}/\partial y + \tau_0 \partial I^{(0)}/\partial y)$$

FIG. 8 shows an example of modified BIO for 8×4 block proposed in JVET-E0028. A simplified version of JVET-E0028 was later proposed to address the issue of mismatch in the outcomes between block-level and sub-block level BIO processes. Instead of using the neighborhood $\Omega$ with all pixels in CU, one or more techniques described herein modify the neighborhood $\Omega$ to include only 5×5 pixels centered at the current pixel without any interpolation or gradient calculation for pixel locations outside of the current CU.

Figure 9A:
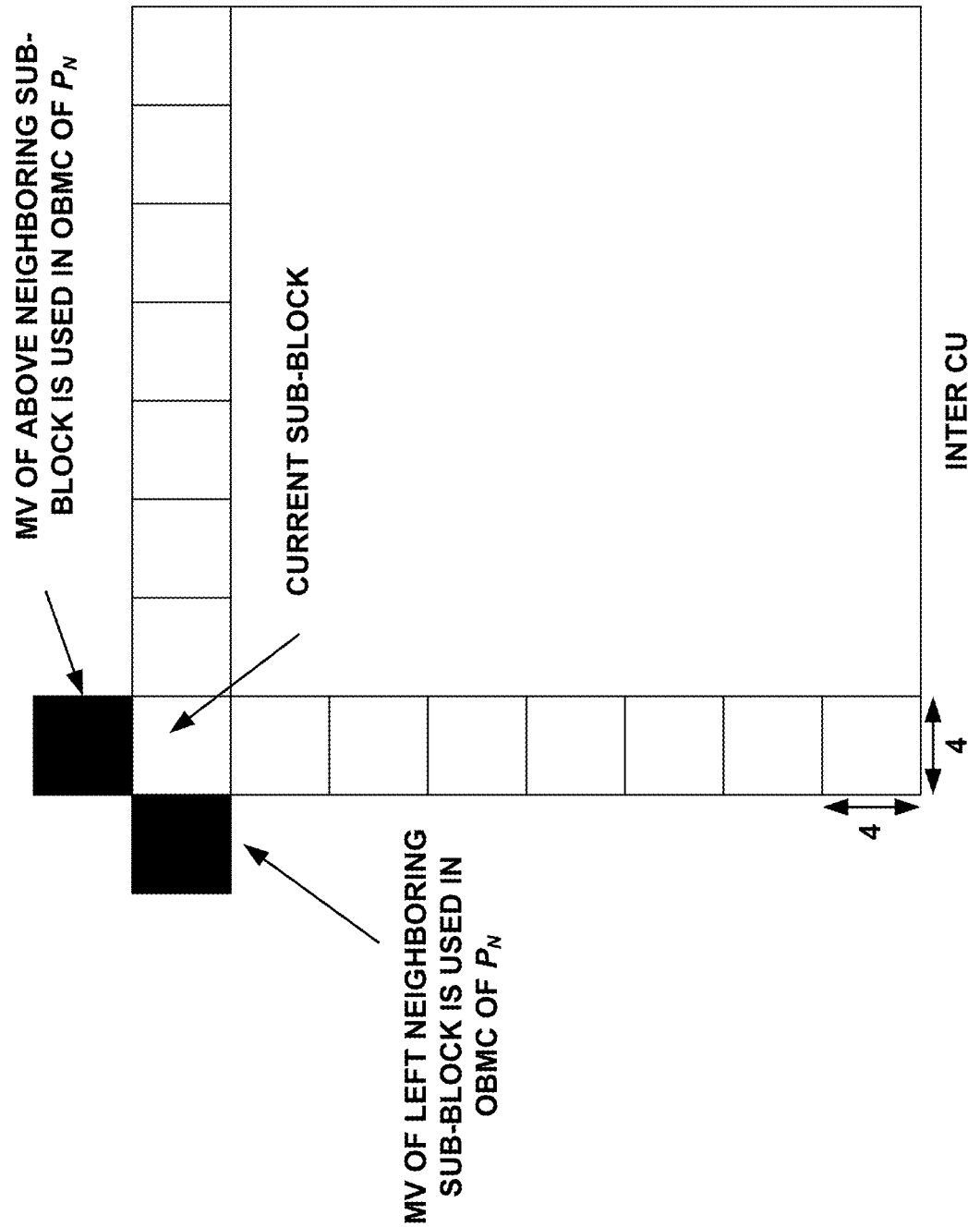
FIGS. 9A-9B are a conceptual diagram illustrating an example illustration of sub-blocks where overlapped block motion compensation (OBMC) applies.
Figure 9B:
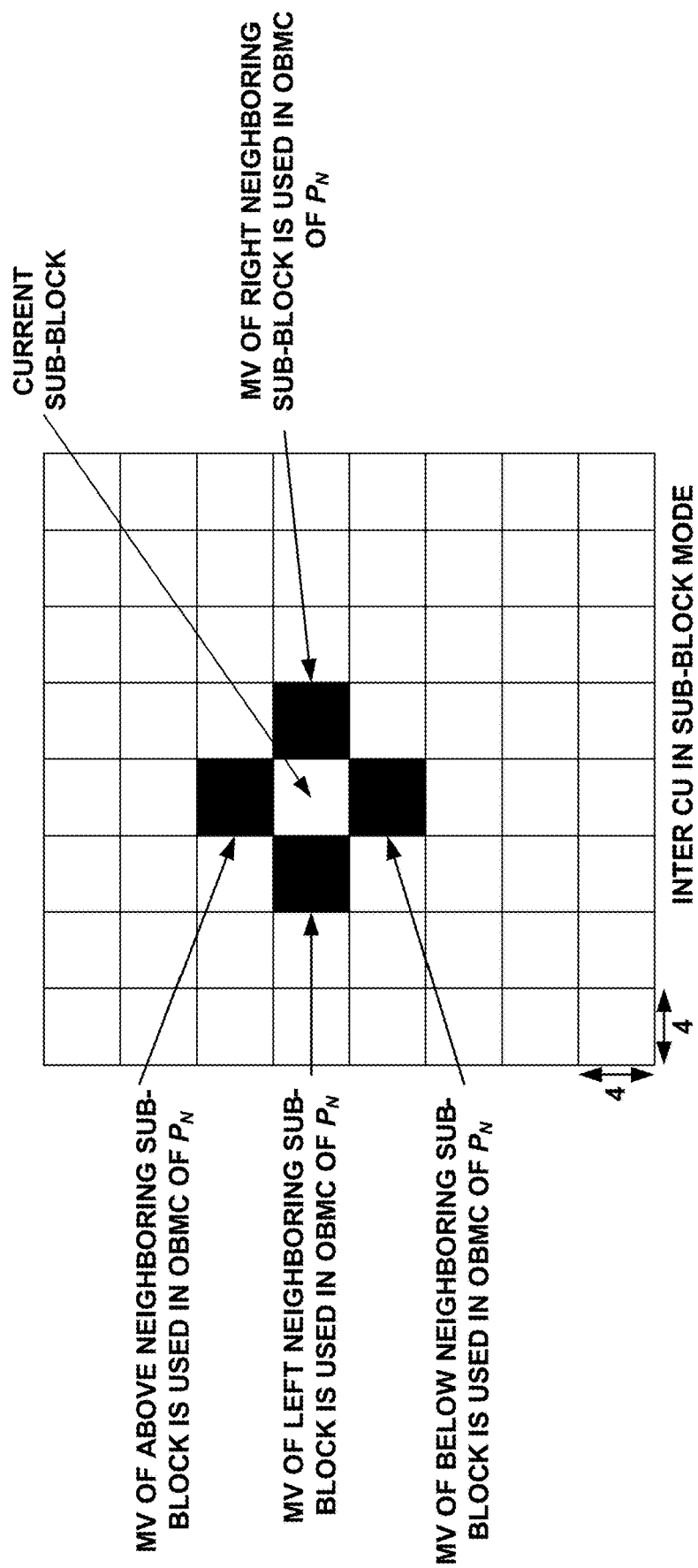
Figure 10A:
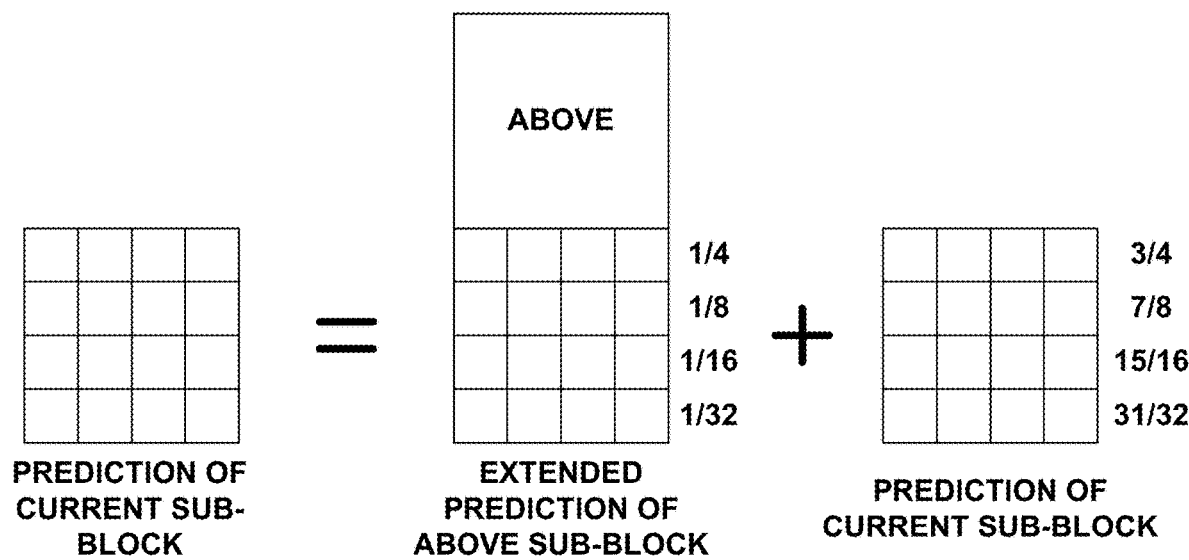
FIGS. 10A-10D are a conceptual diagrams illustrating examples of OBMC weightings.
Figure 10B:
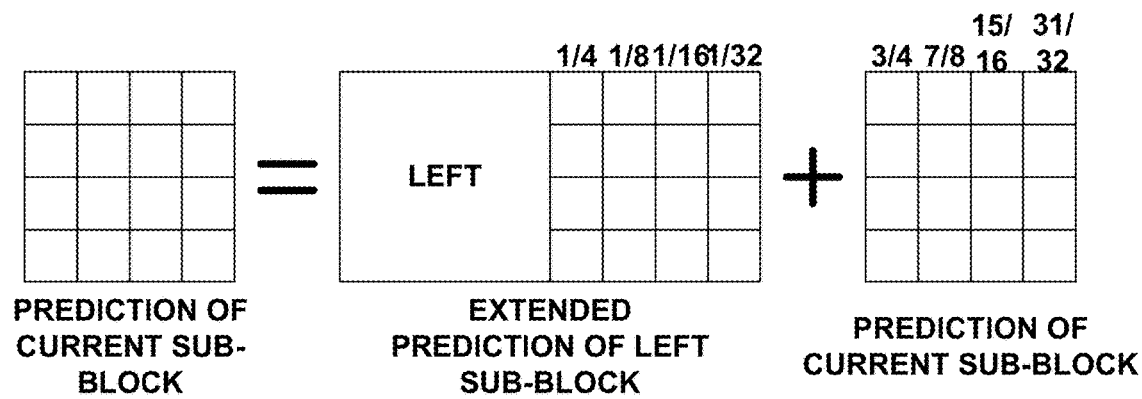
Figure 10C:
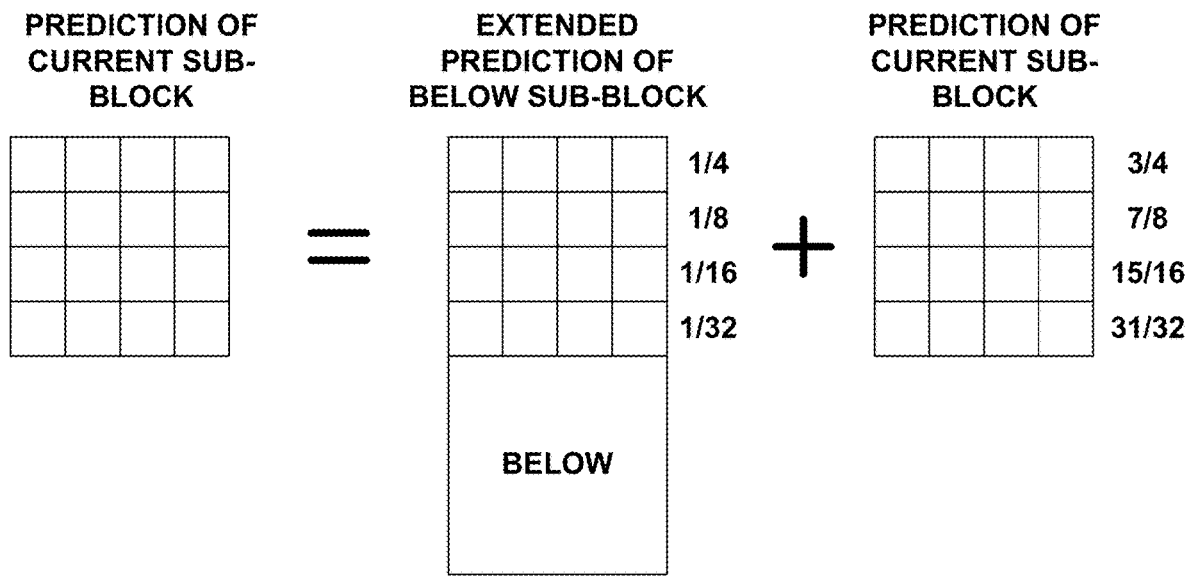
Figure 10D:
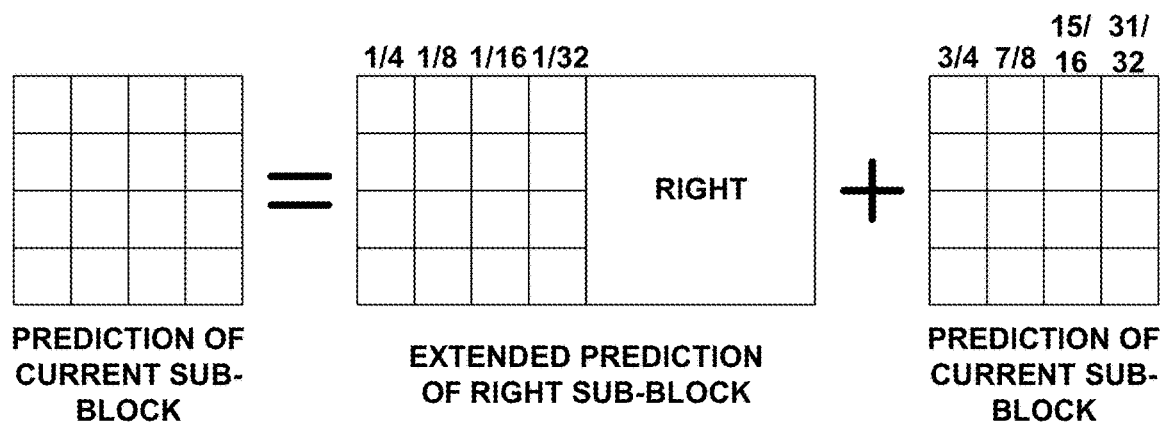

FIGS. 9A and 9B are conceptual diagrams illustrating concepts related to OBMC in examples of JEM. In examples of JEM, OBMC is performed for Motion Compensated (MC) block boundaries except the right and bottom boundaries of a CU. Moreover, it is applied for both luma and chroma components. In one example of JEM, a MC block corresponds to a coding block. When a CU is coded with sub-CU mode (including sub-CU merge, Affine and FRUC mode), each sub-block of the CU is a MC block. To process CU boundaries in a uniform fashion, OBMC is performed at the sub-block level for all MC block boundaries, where sub-block size is set equal to 4×4, as illustrated in FIGS. 9A and 9B.

When OBMC applies to the current sub-block, besides current motion vectors, motion vectors of four connected neighbouring sub-blocks, if available and are not identical to the current motion vector, are also used to derive prediction block for the current sub-block. Said differently, for example, video decoder 30 and/or video encoder 20 may derive a prediction block for the current sub-block using, besides current motion vectors, if available and are not identical to the current motion vector, motion vectors of four connected neighbouring sub-blocks and when OBMC applies to the current sub-block. These multiple prediction blocks based on multiple motion vectors are combined to generate the final prediction signal of the current sub-block. Said differently, for example, video decoder 30 and/or video encoder 20 may combine the multiple prediction blocks based on multiple motion vectors to generate the final prediction signal of the current sub-block.

FIGS. 9A-9B and 10A-10D are conceptual diagrams illustrating OBMC weightings. FIGS. 9A-9B illustrate a prediction block based on motion vectors of a neighboring sub-block is denoted as $P_N$, with N indicating an index for the neighbouring (FIG. 10A), below (FIG. 10C), left (FIG. 10B) and right (FIG. 10D) sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Said differently, for example, video decoder 30 and/or video encoder 20 may not perform OBMC when $P_N$ is based on the motion information of a neighbouring sub-block that contains the same motion information to the current sub-block. Otherwise, every pixel of $P_N$ is added to the same pixel in $P_C$, i.e., four rows/columns of $P_N$ are added to $P_C$. Said differently, for example, video decoder 30 and/or video encoder 20 may add every pixel of $P_N$ to the same pixel in $P_C$, i.e., four rows/columns of $P_N$ are added to $P_C$ when the $P_N$ is based on the motion information of a neighbouring sub-block that does not contain the same motion information to the current sub-block.

The weighting factors {1/4, 1/8, 1/16, 1/32} are used for PN and the weighting factors {3/4, 7/8, 15/16, 31/32} are used for Pc. Said differently, for example, video decoder 30 and/or video encoder 20 may use the weighting factors {1/4, 1/8, 1/16, 1/32} for PN and/or video decoder 30 and/or video encoder 20 may the weighting factors {3/4, 7/8, 15/16, 31/32} for Pc. The exception are small MC blocks, (i.e., when height or width of the coding block is equal to 4 or a CU is coded with sub-CU mode), for which only two rows/columns of PN are added to Pc. In this case weighting factors {1/4, 1/8} are used for PN and weighting factors {3/4, 7/8} are used for Pc. Said differently, for example, video decoder 30 and/or video encoder 20 may use the weighting {¼, ⅛} for Pu and/or video decoder 30 and/or video encoder 20 may use the weighting factors {¾, ⅞} for Pc when a height or a width of the coding block is equal to 4 or a CU is coded with sub-CU mode. For PN generated based on motion vectors of vertically (horizontally) neighbouring sub-block, pixels in the same row (column) of PN are added to Pc with a same weighting factor. Said differently, for example, video decoder 30 and/or video encoder 20 may add pixels in the same row (column) of PN to Pc with a same weighting factor when PN is generated based on motion vectors of vertically (horizontally) neighbouring sub-block. It is noted that BIO is also applied for the derivation of the prediction block PN.

In JEM, for a CU with size less than or equal to 256 luma samples, a CU level flag is signalled to indicate whether OBMC is applied or not for the current CU. Said differently, for example, video encoder 20 may signal a CU level flag to indicate whether OBMC is applied or not for the current CU. For the CUs with size larger than 256 luma samples or not coded with AMVP mode, OBMC is applied by default. Said differently, for example, video decoder 30 and/or video encoder 20 may apply OBMC by default when the CUs with size larger than 256 luma samples or not coded with AMVP mode. At encoder, when OBMC is applied for a CU, its impact is taken into account during motion estimation stage. The prediction signal by using motion information of the top neighboring block and the left neighboring block is used to compensate the top and left boundaries of the original signal of the current CU, and then the normal motion estimation process is applied. Said differently, for example, video decoder 30 and/or video encoder 20 may use the prediction signal by using motion information of the top neighboring block and the left neighboring block to compensate the top and left boundaries of the original signal of the current CU. In this example, video decoder 30 and/or video encoder 20 may apply the normal motion estimation process.

Aspects of pattern matched motion vector derivation (PMMVD) will now be described. PMMVD mode is a special merge mode based on Frame-Rate Up Conversion (FRUC) techniques. With PMMVD mode, motion information of a block is not signaled but derived at decoder side. Said differently, for example, video encoder 20 may not signal motion information of a block. This technology was included in JEM.

A FRUC flag is signaled for a CU when its merge flag is true. Said differently, for example, video encoder 20 may signal a FRUC flag for a CU when a merge flag for the CU is true. When the FRUC flag is false, a merge index is signaled and the regular merge mode is used. Said differently, for example, when the FRUC flag is false, video encoder 20 may signal merge index and video decoder 30 and/or video encoder 20 may use merge mode. When the FRUC flag is true, an additional FRUC mode flag is signaled to indicate which method (bilateral matching or template matching) is used to derive motion information for the block. Said differently, for example, video encoder 20 may signal, when the FRUC flag is true, an additional FRUC mode flag to indicate which method (bilateral matching or template matching) is used to derive motion information for the block. An exemplary syntax table to code flags for FRUC is as follows.

| | |
|---|---|
| fruc_flag | u(1) |
| if(fruc_flag){ | |
|     if(slice_type != P_slice){ | |
|         fruc_mode | u(1) |
|     } | |
| } | |

During the motion derivation process, an initial motion vector is first derived for the whole CU based on bilateral matching or template matching. Said differently, for example, video decoder 30 and/or video encoder 20 may, during the motion derivation processes, derive an initial motion vector for the whole CU based on bilateral matching or template matching. First, the merge list of the CU, or called PMMVD seeds, is checked and the candidate which leads to the minimum matching cost is selected as the starting point. Said differently, for example, video decoder 30 and/or video encoder 20 may check the merge list of the CU, or called PMMVD seeds and selects the candidate which leads to the minimum matching cost selected as the starting point.

Then a local search based on bilateral matching or template matching around the starting point is performed and the MV results in the minimum matching cost is taken as the MV for the whole CU. Said differently, for example, video decoder 30 and/or video encoder 20 may perform a local search based on bilateral matching or template matching around the starting point and takes the MV results in the minimum matching cost as the MV for the whole CU. Subsequently, the motion information is further refined at sub-block level with the derived CU motion vectors as the starting points. Said differently, for example, video decoder 30 and/or video encoder 20 may refine the motion information at the sub-block level with the derived CU motion vectors as the starting points.

Figure 11A:
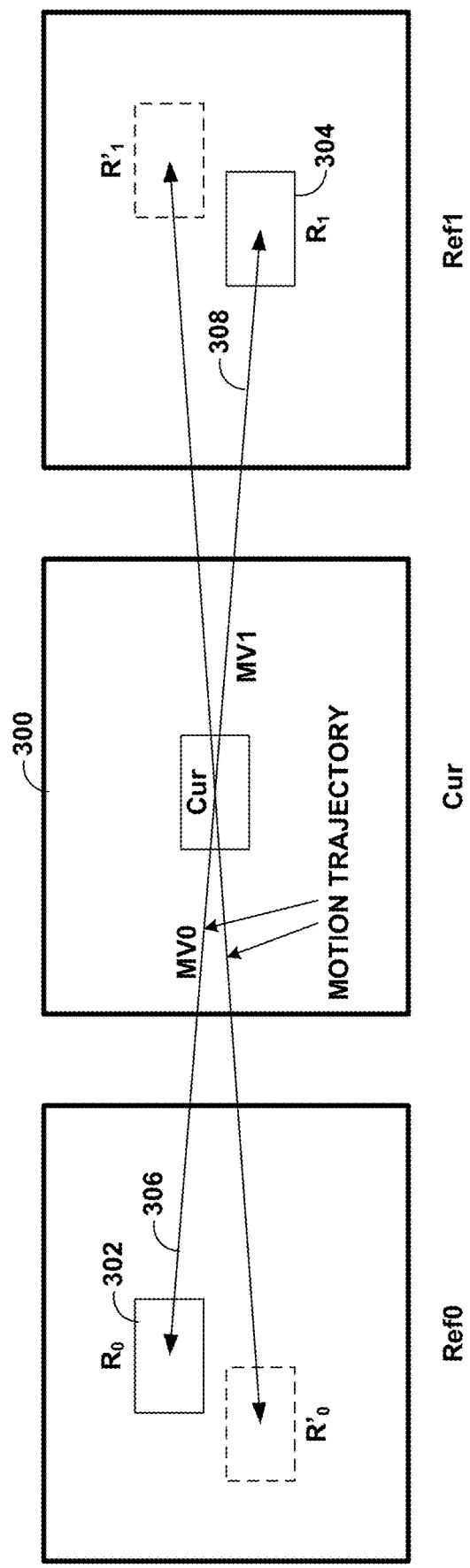
FIG. 11A is a conceptual diagram illustrating an example of bilateral matching.

As shown in FIG. 11A, the bilateral matching is used to derive motion information of the current block by finding the best match between two reference blocks along the motion trajectory of the current block in two different reference pictures. Said differently, for example, video decoder 30 and/or video encoder 20 may use bilateral matching to derive motion information of the current block by finding the best match between two reference blocks along the motion trajectory of the current block in two different reference pictures. Under the assumption of continuous motion trajectory, the motion vectors MV0 306 and MV1 308 pointing to the first input reference block 302 and the second input reference block 304, respectively, shall be proportional to the temporal distances between the current picture 300 and the first input reference block 302 and the second input reference block 304. As a special case, when the current picture 300 is temporally between the two reference pictures and the temporal distance from the current picture to the first input reference block 302 and the second input reference block 304 are the same, the bilateral matching becomes mirror based bi-directional MV.

Figure 11B:
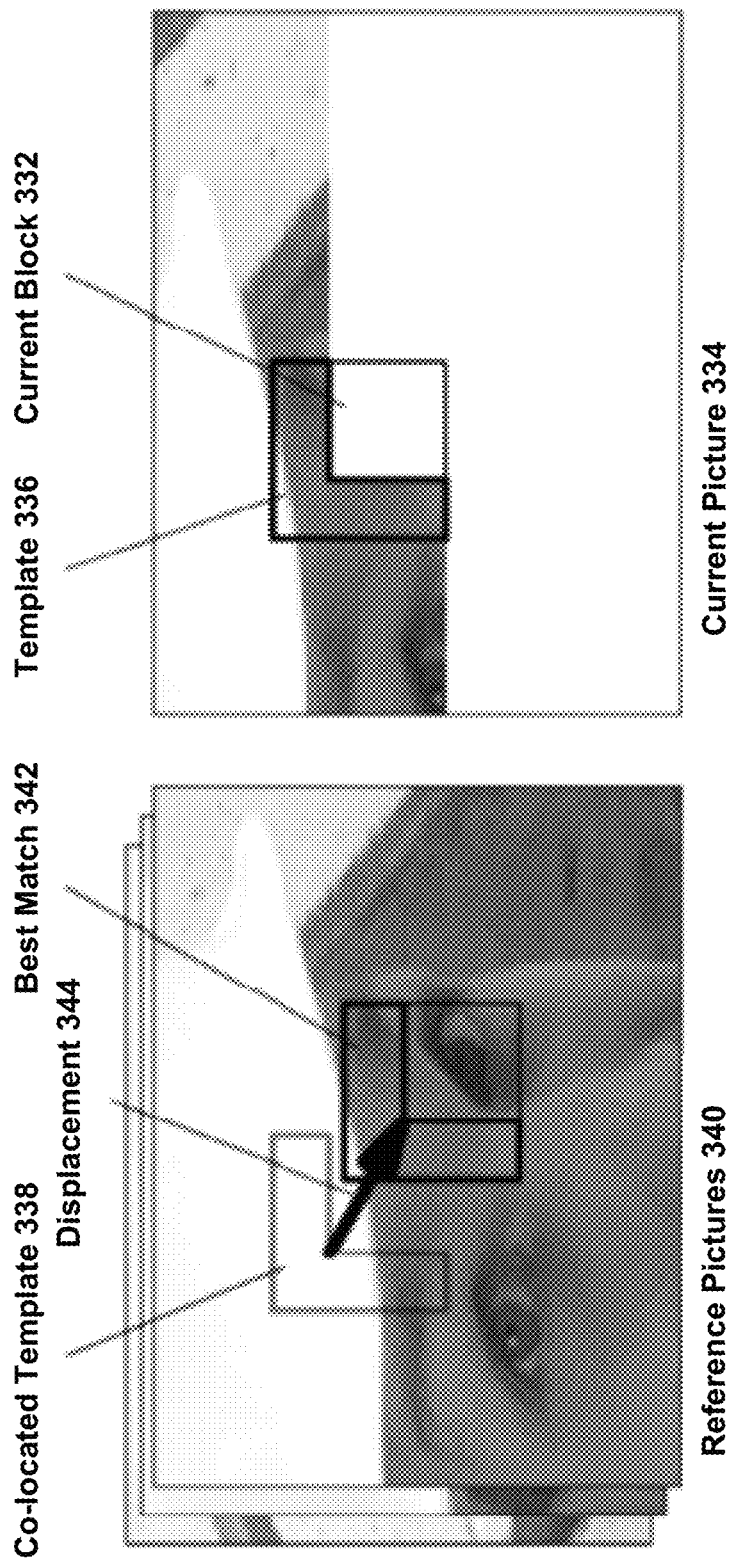
FIG. 11B is a conceptual diagram illustrating another example of bilateral matching.

FIG. 11B shows another example of bilateral matching. In the example of FIG. 11B, current block 332 of current picture 334 is inter predicted using template matching. Template 336 defines a shape that covers already-decoded neighboring blocks of current block 332. A video decoder (e.g., video decoder 30) may, for example, first compare the pixel values included in the already-decoded neighboring blocks covered by template 336 to pixel values included in the already-decoded neighboring blocks covered by co-located template 338, which covers blocks located in a reference picture of reference pictures 340. The video decoder may then move the template to other locations in the reference picture and compare the pixel values covered by the template to the pixel values included in the already-decoded neighboring blocks covered by template 636.

Based on these multiple comparisons, the video decoder may determine a best match, such as best match 342 shown in the example of FIG. 11B. The video decoder may then determine a displacement between the best match and the co-located template (e.g., a block in the reference picture 340 having a shape of template 336). This displacement (e.g., displacement 344 in FIG. 11B) may correspond to the motion vector information used to predict current block 332.

As illustrated in FIG. 11B, when a block is coded in DMVD mode, the MV for the block is searched by video decoder 30, as opposed to being directly signaled to video decoder 30. The MV which leads to the minimal distortion by template matching is selected as the final MV for the block. To keep high coding efficiency, a certain number of template matches may be necessary for video decoder 30 to select a candidate motion vector as the MV to decode the current block, which may increase decoding complexity.

Figure 12:
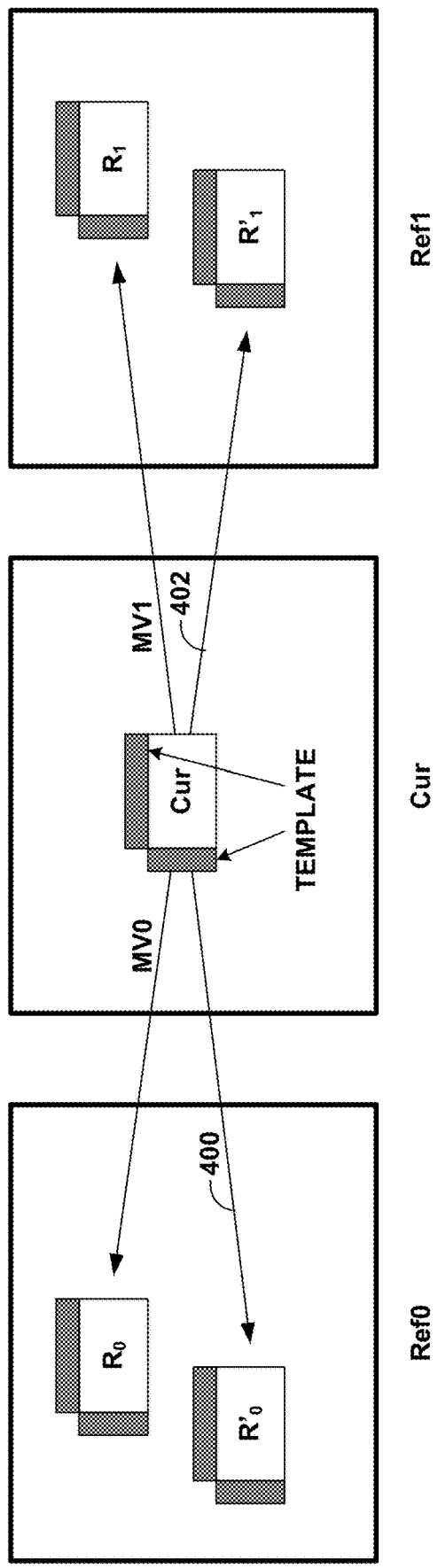
FIG. 12 is a conceptual diagram illustrating an example of template matching.

In the example of FIG. 12, template matching is used to derive motion information of the current block (Cur) by finding the best match between a template (top and/or left neighboring blocks of the current block) in the current picture and a block (same size to the template) in a reference picture (Ref0 and Ref1). A template may include neighboring pixels of a block that is used to compare a block of interest (Cur) with candidate references ($R_0$ with MV0 and $R_1$ with MV1) or derived references ($R'_0$ with MV 400 and $R'_1$ with MV 402) by searching neighboring blocks of $R_0$ and $R_1$. The most similar reference is then used as the prediction.

At video encoder 20, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used. Said differently, for example, video encoder 20 may signal an indication that the FRUC flag is set to true for the CU when FRUC matching mode is the most efficient mode (e.g., bilateral matching and template matching). In this example, video encoder 20 and/or video decoder may use the FRUC matching mode.

Figure 13:
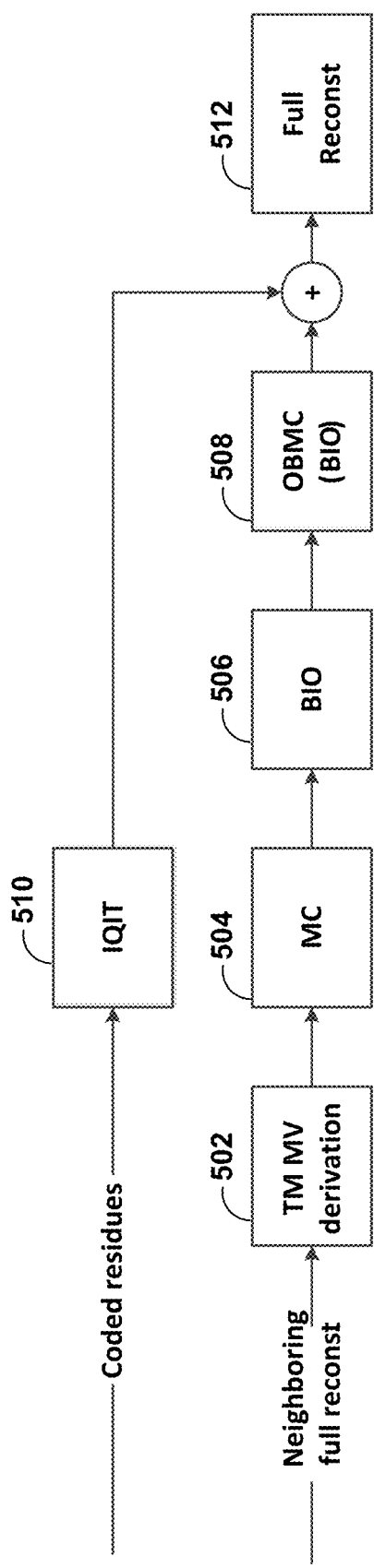
FIG. 13 is a block diagram illustrating a template matching (TM) MV derivation and inter prediction.

In some systems, template matching (TM) based MV derivation relies on full reconstruction of neighboring blocks. FIG. 13 shows the block diagram of TM based MV derivation and inter prediction after TM based MV derivation. First, MV information 502 of the current block is derived based on the full reconstruction of previously coded blocks. Then, motion compensation (MC) 504 is conducted with the MV. After that, BIO 506 and OBMC 508 are further applied to generate the full inter prediction. During the process of MC, dequantization and inverse-transform (IQIT) 510 are performed on coded residual sample values in parallel. Finally, the output of IQIT and full inter prediction are added to form the full reconstruction of the current block 512.

Figure 14:
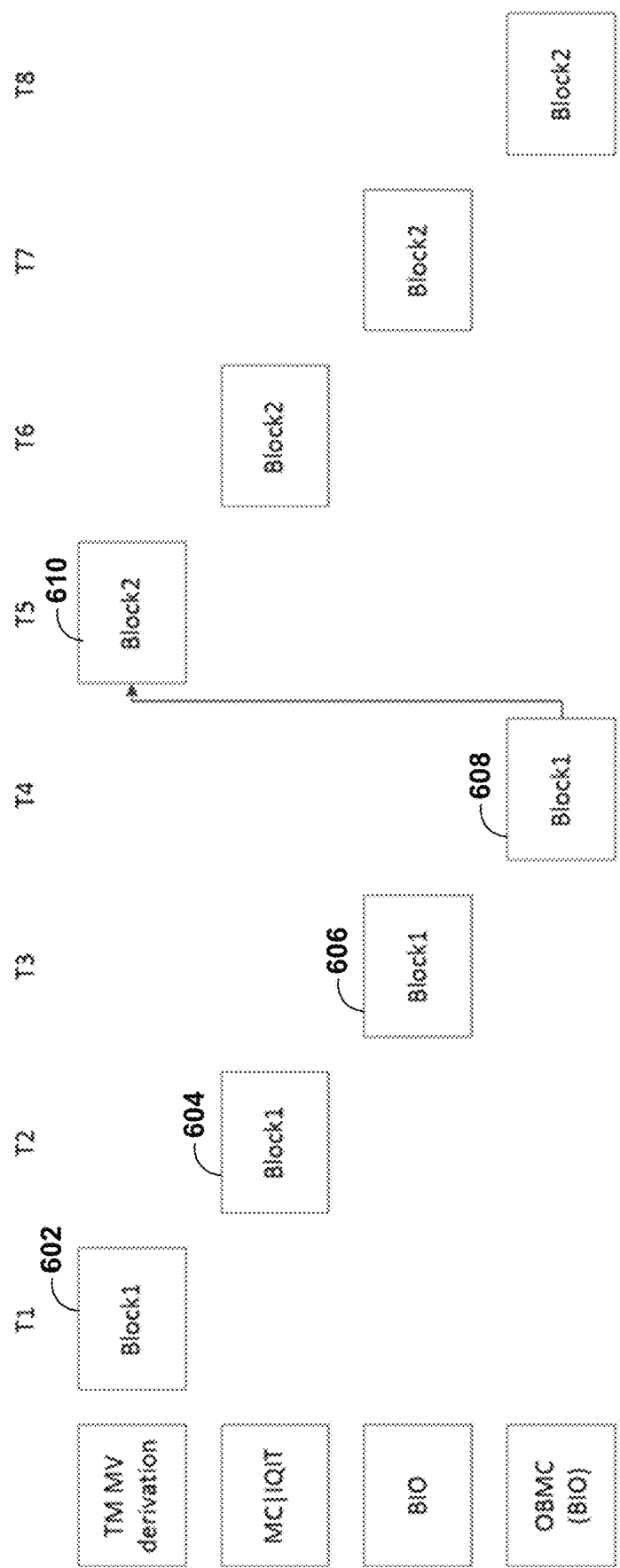
FIG. 14 is a timing diagram illustrating a TM MV derivation and inter prediction pipeline processing.

However, such designs are not computational efficient when implemented in hardware. FIG. 14 illustrates the pipeline processing diagram for TM MV derivation and inter prediction, in which time stage and modules are shown horizontally and vertically. At first time (T1) stage, TM MV 602 derivation is performed for first block (block 1). Then, at second time (T2), MC and IQIT 604 are conducted in parallel for the first block. Then, BIO 606 is executed for the first block at third time (T3). Then, OBMC 608 is executed at fourth time (T4) for the first block. As the TM MV derivation is based on full reconstruction of neighboring (e.g., left, top, etc.) blocks, TM MV 610 derivation for a second block (block 2) is not started until the full reconstruction of the first block is available (after T4 stage). Because MC, BIO, OBMC are frequently computationally complex, the latency of T2+T3+T4 may be relatively large, resulting in a low efficiency hardware pipe line.

In accordance with one or more techniques described herein, when using template matching based MV derivation, the template for a current block MV derivation is based on partial reconstruction (or non-full reconstruction) of a neighboring block if the neighboring block is inter coded. Said differently, for example, video encoder 20 and/or video decoder 30 may determine a neighboring block in a current frame is inter coded. In this example, video encoder 20 and/or video decoder 30 may, in response to determining the neighboring block is inter coded, determine a template for a current block in the current frame based on a partial reconstruction of the neighboring block.

Figure 15:
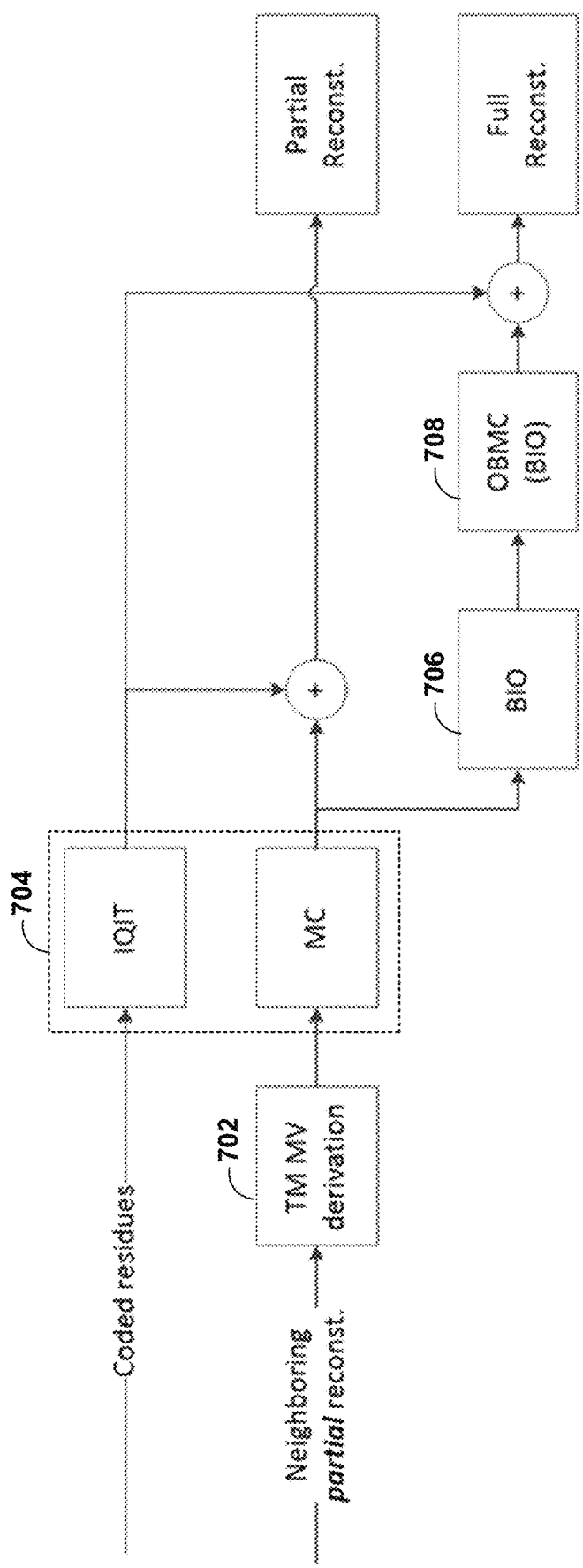
FIG. 15 is a flowchart illustrating a TM MV derivation and inter prediction using one or more techniques described herein.

In one example, template matching is based on the output of partial inter prediction and inverse transformed dequantized residual sample values, where the partial inter prediction means that the inter prediction process is not fully performed. For example, as shown in FIG. 15, template matching may be based on the output of partial inter prediction and inverse transformed dequantized residual sample values where the template is based on the output of MC plus residual sample values (e.g., residual sample values denote the output by module IQIT) of neighboring blocks. Said differently, for example, video encoder 20 and/or video decoder 30 may apply motion compensation to motion vector information for the neighboring block to generate the partial reconstruction of the neighboring block. In this example, video encoder 20 and/or video decoder 30 may determine the template based on residual sample values for the neighboring block and the partial reconstruction of the neighboring block. For instance, video encoder 20 and/or video decoder 30 may add residual sample values for the neighboring block to the predictive block for the neighboring block to form the partial reconstruction of the neighboring block. In some examples, video decoder 30 may receive an indication of residual sample values for the neighboring block from video encoder 20. In this example, video decoder 30 may add the residual sample values to a predictive block for the neighboring block to form the partial reconstruction of the neighboring block.

Figure 16:
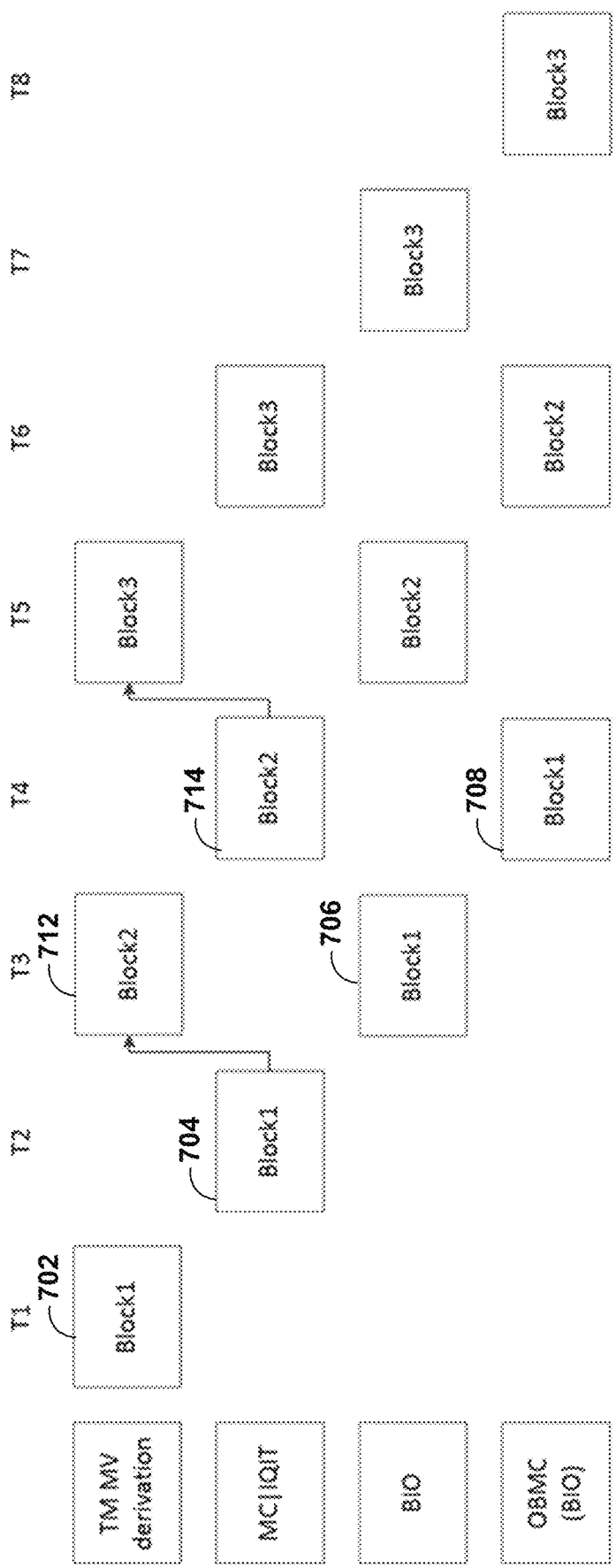
FIG. 16 is a timing diagram illustrating a TM MV derivation and inter prediction using one or more techniques described herein.

With one or more techniques illustrated in FIG. 15, the pipe line diagram of TM MV derivation and inter prediction may be described in FIG. 16. For example, video encoder 20 and/or video decoder 30 perform TM MV 702 derivation for a first block at first time (T1) stage. In this example, video encoder 20 and/or video decoder 30 perform MC and IQIT 704 in parallel for the first block at second time (T2). In this example, video encoder 20 and/or video decoder 30 perform BIO 706 for the first block at third time (T3).

In accordance with one or more techniques described herein, video encoder 20 and/or video decoder 30 further perform TM MV 712 derivation for a second block at the third time (T1). That is, in this example, video encoder 20 and/or video decoder 30 perform TM MV 712 derivation for a second block using the output of MC plus residual sample values (e.g., residual sample values denote the output by module IQIT) of neighboring blocks at the third time (and in parallel with performing BIO 706 for the first block).

Video encoder 20 and/or video decoder 30 may execute OBMC 708 for the first block at fourth time (T4). Further, video encoder 20 and/or video decoder 30 may perform MC and IQIT 714 in parallel for the second block at the fourth time. That is, in this example, video encoder 20 and/or video decoder 30 performs OBMC 708 for the first block at the fourth time (in parallel with MC and IQIT 714 for the second block). In this example, video encoder 20 and/or video decoder 30 fully reconstruct the first block at the fourth time after determining the template for the second block at the third time. As shown, the process may repeat for additional blocks (e.g., a third block).

Compared to FIG. 14, the TM MV derivation process of the second block (block2) of FIGS. 15 and 16 may be started at stage T3 instead of stage T5 so that the efficiency of pipe line is improved. Although FIG. 14 illustrates an example where TM MV derivation uses the output of MC plus residual sample values (e.g., residual sample values denote the output by module IQIT) of neighboring blocks, in some examples, video encoder 20 and/or video decoder 30 may perform TM MV derivation at other stages and/or without using residual sample values as described below.

In some examples, the template is based on the output of BIO plus residual sample values (residual sample values denote those after de-quantization and inverse transform) of neighboring blocks. Said differently, for example, video encoder 20 and/or video decoder 30 may apply bi-directional optical flow to samples for the neighboring block to generate the partial reconstruction of the neighboring block. In this example, video encoder 20 and/or video decoder 30 may determine the template is based on residual sample values for the neighboring block and the partial reconstruction of the neighboring block. For instance, video encoder 20 and/or video decoder 30 may add residual sample values for the neighboring block to the predictive block for the neighboring block to form the partial reconstruction of the neighboring block.

In some examples, the template is based on the output of partial OBMC with or without considering residual sample values, where partial OBMC means OBMC has been performed partially but not fully conducted. For instance, video encoder 20 and/or video decoder 30 may apply OBMC to some but not all samples of a neighboring block. Said differently, for example, video encoder 20 and/or video decoder 30 may apply partial OBMC to samples for the neighboring block such that OBMC has been performed partially but not fully to generate the partial reconstruction of the neighboring block. In this example, video encoder 20 and/or video decoder 30 may determine the template is based the partial reconstruction of the neighboring block and residual sample values for the neighboring block or based the partial reconstruction of the neighboring block without residual sample values for the neighboring block.

In some examples, the template is based on the output of MC without adding residual sample values. Said differently, for example, video encoder 20 and/or video decoder 30 may apply motion compensation to motion vector information for the neighboring block without adding a residue for the neighboring block to generate the partial reconstruction of the neighboring block.

In some examples, the template is based on the output of BIO without adding residual sample values. Said differently, for example, video encoder 20 and/or video decoder 30 may apply bi-directional optical to samples for the neighboring block without adding a residue for the neighboring block to generate the partial reconstruction of the neighboring block.

In some examples, the template is based on the output of OBMC without adding residual sample values. Said differently, for example, video encoder 20 and/or video decoder 30 may apply OBMC with motion information to samples for the neighboring block such that OBMC has been performed partially but not fully without adding a residue for the neighboring block to generate the partial reconstruction of the neighboring block. For instance, video encoder 20 and/or video decoder 30 may apply OBMC to some but not all samples of a neighboring block. Again, video encoder 20 and/or video decoder 30 may determine the template is based the partial reconstruction of the neighboring block and residual sample values for the neighboring block or based the partial reconstruction of the neighboring block without residual sample values for the neighboring block.

In some examples, a block coded with intra block copy (a screen content coding tool) is regarded as an inter coded block. Said differently, for example, video encoder 20 and/or video decoder 30 may determine the neighboring block is inter coded when the neighboring block is coded with intra block copy.

In some examples, video encoder 20 can signal to video decoder 30 what output the template is based on. For example, video encoder 20 may signal to video decoder 30 that the template is based on the output of MC without adding residual sample values. Or video encoder 20 may signal to video decoder 30 that the template is based on the output of BIO without adding residual sample values. This information can be signaled at sequence level, picture level or slice level, such as in a video parameter set (VPS), sequence parameter set (SPS), picture parameter set (PPS), and slice header. Said differently, for example, video decoder 30 may receive, in video data, syntax data specifying a partial reconstruction mode to generate the partial reconstruction of a neighboring block. In some examples, video decoder 30 may generate the partial reconstruction of the neighboring block using the partial reconstruction mode. For example, video decoder 30 may determine the template based on the output of MC without adding residual sample values.

In some examples, different weighting can be used to the top and the left templates when one of them employs partial reconstruction samples. For example, if left template uses partial reconstruction samples and top template uses full reconstruction samples for template matching, lighter weighting factor (e.g., less than 1) can be applied to the SAD values from the left template than the top template. The weighting factor can be defined statically or signalled via VPS/SPS/PPS/Slice Header. In some examples, the weighting factor can be found by iterative search. Consider the same example of left template being partial reconstructed, an initial search using both weights equal to one for left and top templates, and the weights can be calculated inversely proportional to SAD value of the left template in the initial search. At the second or consecutive refinement, such a weight can be applied to the SAD value of the left template to further refine the motion vector.

When using template matching based MV derivation, the template is based on partial reconstruction of a neighboring block if the neighboring block is intra coded. In some examples, the template for a current block MV derivation is based on full reconstruction of a neighboring blocks if the neighboring block is intra coded and the template for a current block MV derivation is based on partial reconstruction of a neighboring block if the neighboring block is inter coded. Said differently, for example, video encoder 20 and/or video decoder 30 may, in response to determining a neighboring block is intra coded, determine a template for a current block in the current frame based on a full reconstruction of the neighboring block.

In some examples, partial reconstruction of an intra block is based on intra prediction and without adding residual sample values. Said differently, for example, video encoder 20 and/or video decoder 30 may perform partial reconstruction of an intra block is based on intra prediction and without adding residual sample values.

In some examples, a block coded with intra block copy may be regarded as an intra coded block. Said differently, for example, video encoder 20 and/or video decoder 30 may determine a block coded with intra block copy is an intra coded block.

In some examples, video encoder 20 may signal whether the partial reconstruction samples would be used or not as a template when it is intra coded. In some examples, such flag can be hidden in the residual of the neighboring block when it is intra coded (e.g., using parity of the residual samples of the last row or column). Such joint optimization between CUs may require the encoder to use techniques such as multi-pass encoding or super CU.

When using template matching based MV derivation, the template is based on filtered partial reconstruction of a neighboring block if the block is inter coded, or based on filtered full reconstruction of a neighboring block if the block is intra coded. Said differently, for example, video encoder 20 and/or video decoder 30 may determine, when using template matching based MV derivation, the template based on filtered partial reconstruction of a neighboring block if the block is inter coded, or based on filtered full reconstruction of a neighboring block if the block is intra coded.

In some examples, the filtering process is a sample smoothing process. Said differently, for example, video encoder 20 and/or video decoder 30 may filter the partial reconstruction of the neighboring block.

In some examples, the filtering process is a process of pixel range clipping process. Said differently, for example, video encoder 20 and/or video decoder 30 may filter the partial reconstruction of the neighboring block using pixel range clipping.

In some examples, when an iterative search is applicable, a cross-boundary filter can be applied between the prediction samples generated by the initial search and the template using partial reconstructed samples can be used as a refined template for the next search. Said differently, for example, video encoder 20 and/or video decoder 30 may apply, when an iterative search is applicable, a cross-boundary filter between the prediction samples generated by the initial search and the template using partial reconstructed samples as a refined template for the next search.

In some examples, a deblocking filter can be applied after the initial search, where the first 4 sample rows or columns of the current block can be generated using either bi-lateral filter, HEVC filter, or any other interpolations. Said differently, for example, video encoder 20 and/or video decoder 30 may apply a deblocking filter after the initial search, where the first 4 sample rows or columns of the current block are generated using either bi-lateral filter, HEVC filter, or another interpolation. The 4 sample rows or columns may be combined with the template with partial reconstruction samples to refine the template for further search. Said differently, for example, video encoder 20 and/or video decoder 30 may combine the 4 sample rows or columns with the template with partial reconstruction samples to refine the template for further search.

The partial reconstruction can be conducted only for some components or some areas in a block. Said differently, for example, video encoder 20 and/or video decoder 30 may conduct partial reconstruction only for some components or some areas in a block.

In some examples, the partial reconstruction is only calculated and stored for luma component. Said differently, for example, video encoder 20 and/or video decoder 30 may determine a first template is for a luma component of the current block based on a partial reconstruction of a neighboring block. In this example, video encoder 20 and/or video decoder 30 may determine a second template for chroma components for the current block based on a full reconstruction of the neighboring block. In this example, video encoder 20 and/or video decoder 30 may code the current block of video data further based on the second template. For instance, video decoder 30 may decode the current block using a first set of samples for the luma components for the current block that are generated based on the first template and a second set of samples for the chroma components for the current block that are generated based on the second template.

Figure 17:
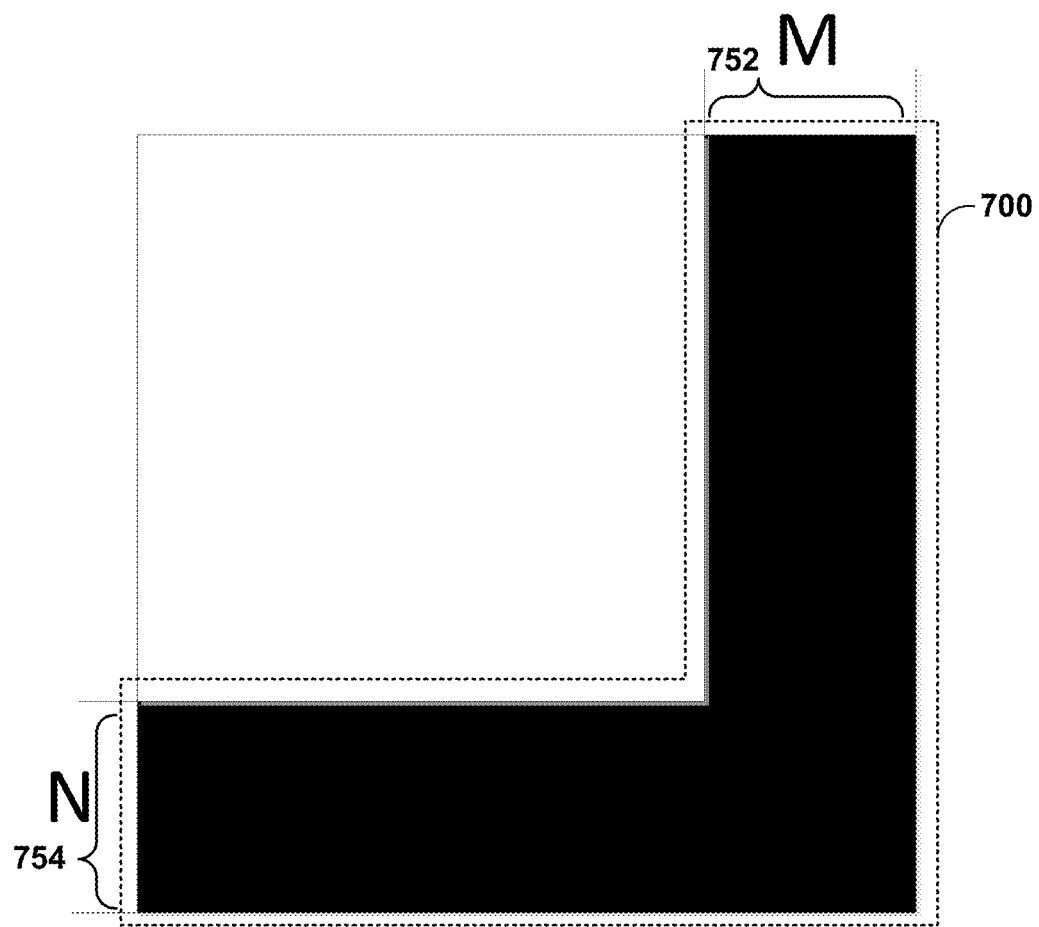
FIG. 17 is a conceptual diagram illustrating an example partial reconstruction.

FIG. 17 shows area 700 that may be used to calculate a partial output. In some examples, the partial reconstruction is only calculated for the samples (e.g., area 700) in the M right columns 752 or N bottom rows 754. M and N are any integers. In one example, M and N are both 4. Said differently, for example, video encoder 20 and/or video decoder 30 may determine a first template is for a first set of samples of the current block based on a partial reconstruction of a neighboring block (e.g., area 700). In this example, video encoder 20 and/or video decoder 30 may determine a second template for a second set of samples for the current block based on a full reconstruction of the neighboring block. In this example, video encoder 20 and/or video decoder 30 may code the current block of video data further based on the second template. For instance, video decoder 30 may decode the current block using the first set of samples for the current block that are generated based on the first template and a second set of samples for the current block that are generated based on the second template.

Figure 18:
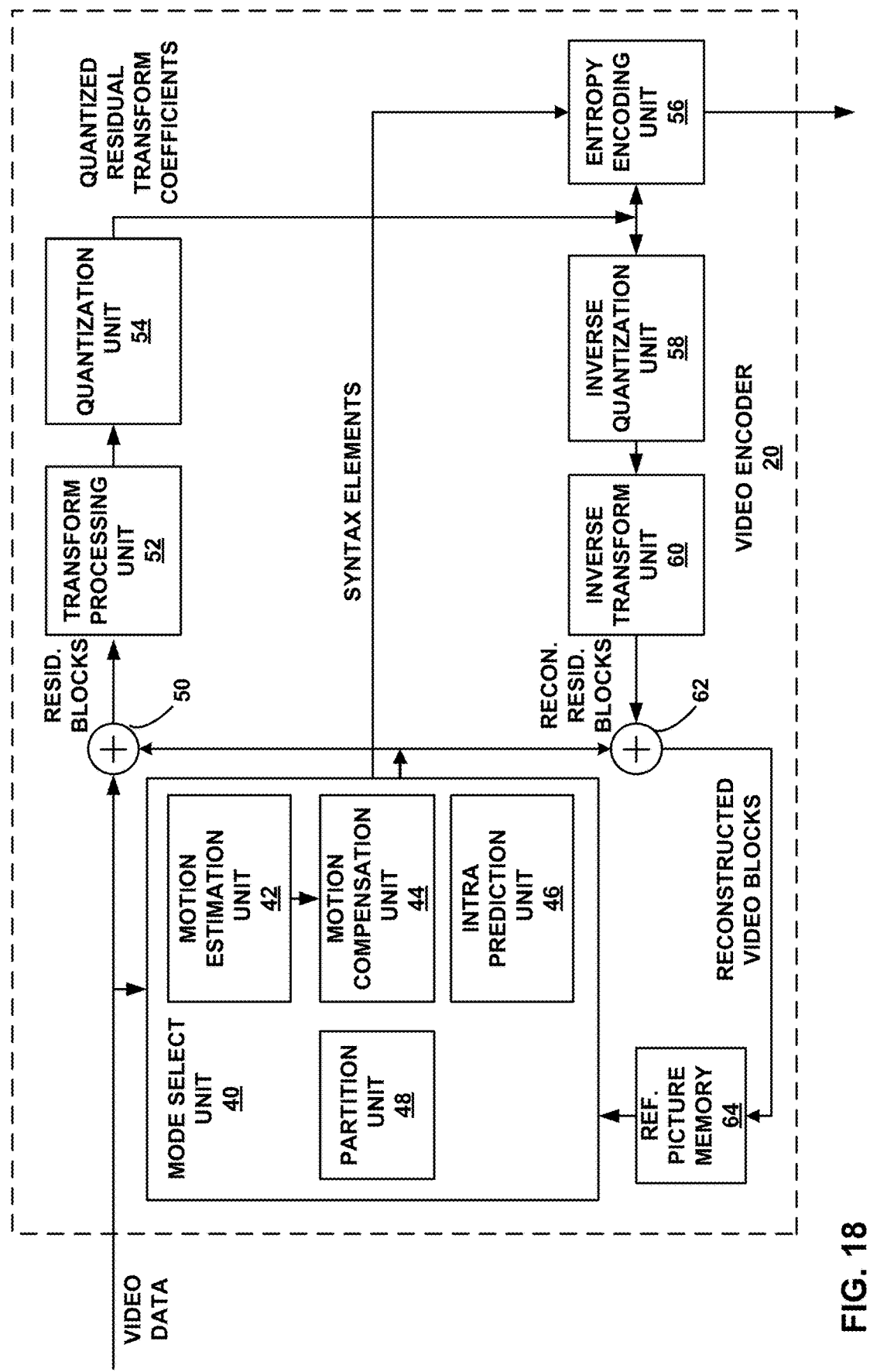
FIG. 18 is a block diagram illustrating an example of a video encoder.

FIG. 18 is a block diagram illustrating an example of video encoder 20 that may implement techniques for bi-directional optical flow. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 18, video encoder 20 receives a current video block within a video frame to be encoded. In the example of FIG. 18, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 18) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 62 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively intra-predict the received video block using pixels of one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Furthermore, motion compensation unit 44 may be configured to perform any or all of the techniques of this disclosure (alone or in any combination). Although discussed with respect to motion compensation unit 44, it should be understood that mode select unit 40, motion estimation unit 42, partition unit 48, and/or entropy encoding unit 56 may also be configured to perform certain techniques of this disclosure, alone or in combination with motion compensation unit 44. In one example, motion compensation unit 44 may be configured to perform the template matching using a partial reconstruction of a neighboring block techniques discussed herein.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 19:
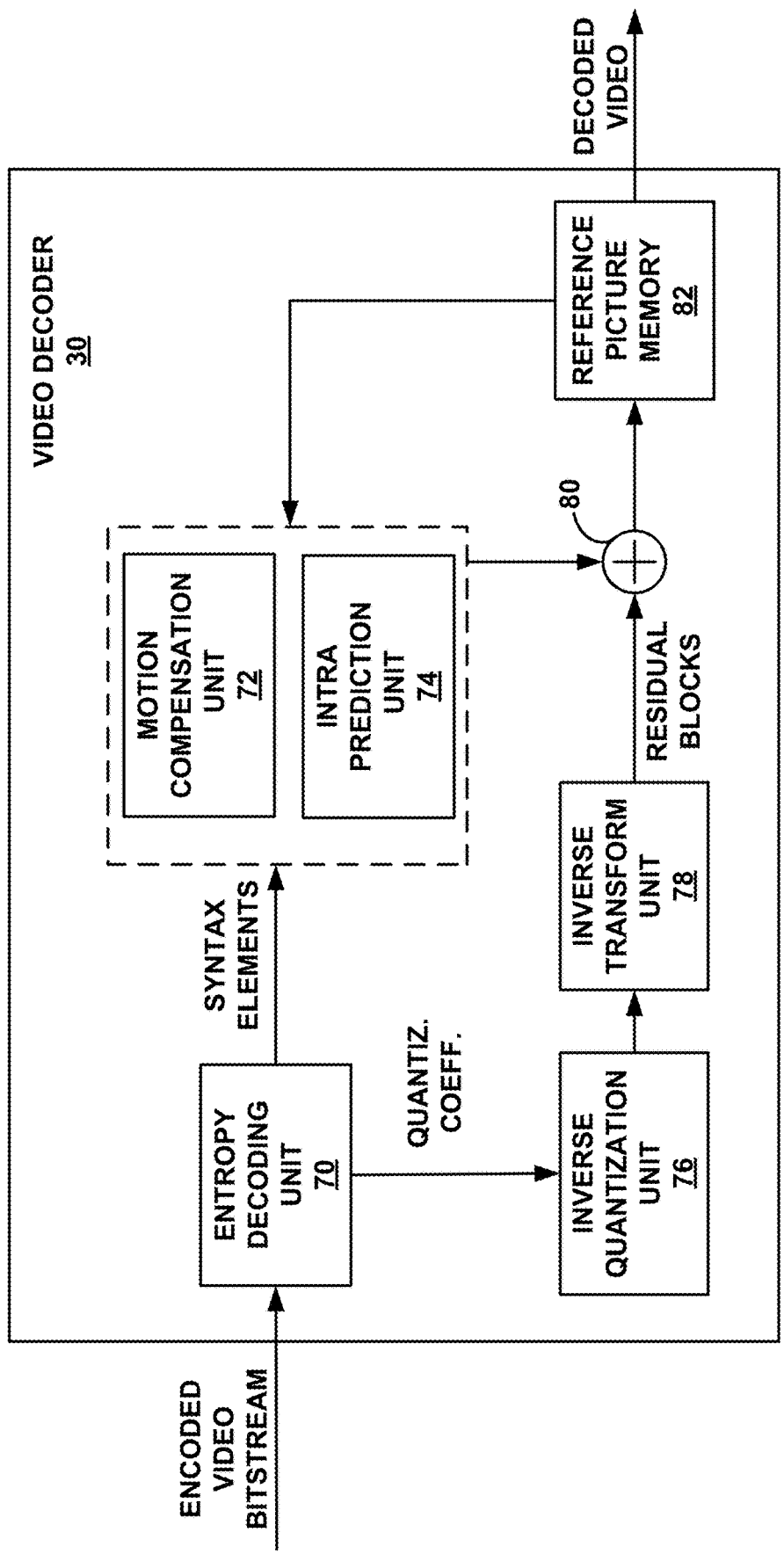
FIG. 19 is a block diagram illustrating an example of a video decoder that may implement techniques for bi-directional optical flow.

FIG. 19 is a block diagram illustrating an example of video decoder 30 that may implement techniques for bi-directional optical flow. In the example of FIG. 19, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 18). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters for sub-pixel precision. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Furthermore, motion compensation unit 72 may be configured to perform any or all of the techniques of this disclosure (alone or in any combination). For example, motion compensation unit 72 may be configured to perform the template matching using a partial reconstruction of a neighboring block techniques discussed herein.

Inverse quantization unit 76 inverse quantizes, i.e., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1. For example, reference picture memory 82 may store decoded pictures.

Figure 20:
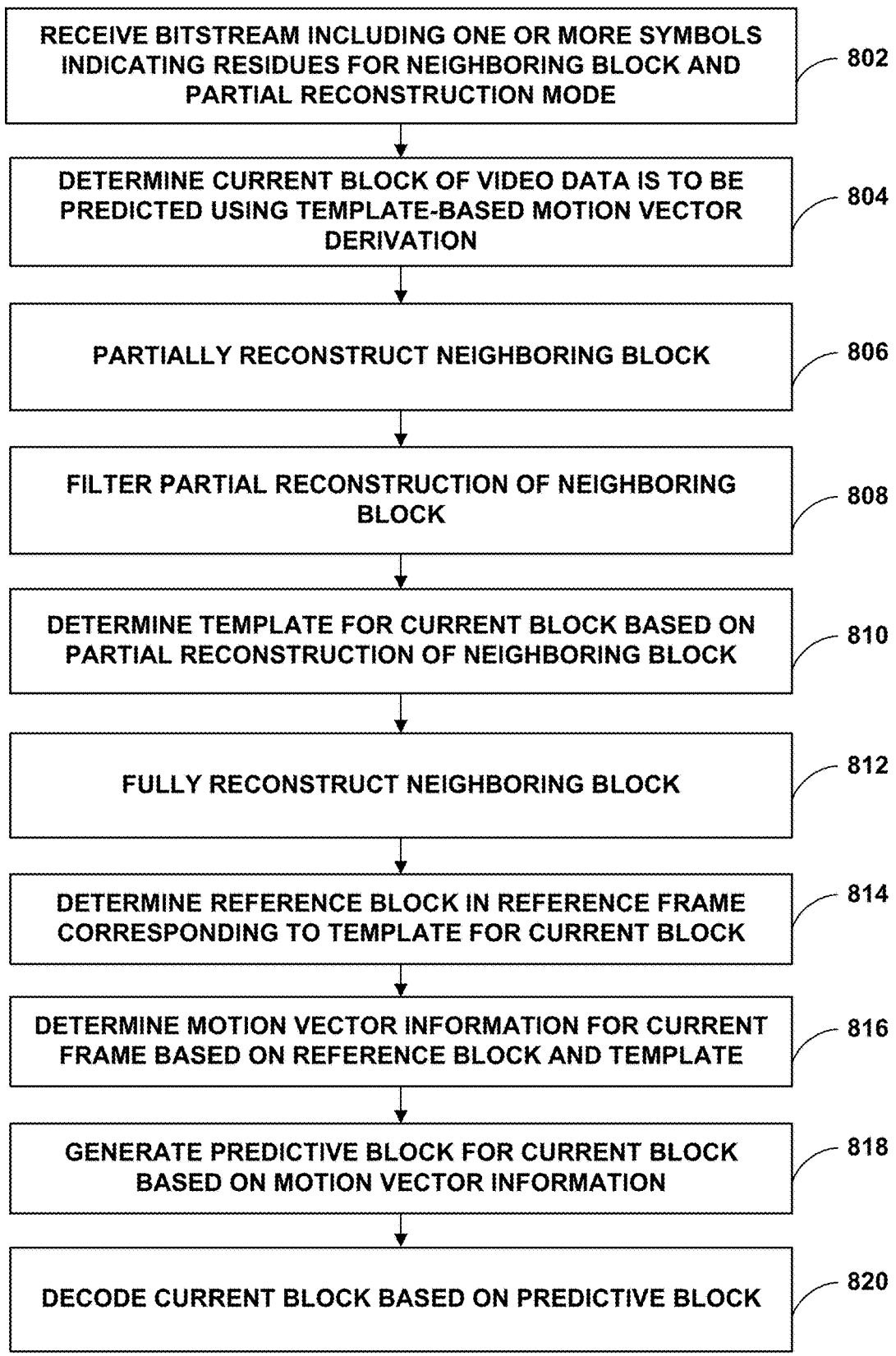
FIG. 20 is a flowchart illustrating an example method of decoding video data in accordance with one or more techniques described in this disclosure.

FIG. 20 is a flowchart illustrating an example method of decoding video data in accordance with one or more techniques described in this disclosure. Initially, video decoder 30 receives a bitstream including one or more symbols indicating residual sample values for a neighboring block and a partial reconstruction mode (802). For example, video decoder 30 receives a bitstream including one or more symbols that indicate the partial reconstruction mode includes template matching or bilateral matching. Although the example of FIG. 20 includes receiving a bitstream including one or more symbols indicating residual sample values for a neighboring block, in some examples, the residual sample values for generating the partial reconstruction of the neighboring block may be omitted. For example, video decoder 30 receives a bitstream including one or more symbols that omit an indication of the residual sample values for generating the partial reconstruction of the neighboring block.

The partial reconstruction mode may indicate whether to generate the partial reconstruction of the neighboring block with residual sample values for the neighboring block or without residual sample values for the neighboring block. For example, video decoder 30 receives a bitstream including one or more symbols that indicate the partial reconstruction mode includes generating the partial reconstruction of the neighboring block without residual sample values for the neighboring block. In some examples, video decoder 30 receives a bitstream including one or more symbols that indicate the partial reconstruction mode includes generating the partial reconstruction of the neighboring block with residual sample values for the neighboring block.

The partial reconstruction mode may specify a partial reconstruction of the neighboring block. For example, video decoder 30 receives a bitstream including one or more symbols that indicate the partial reconstruction mode includes applying motion compensation to motion vector information for the neighboring block to generate a partial reconstruction of the neighboring block. In some examples, video decoder 30 receives a bitstream including one or more symbols that indicate the partial reconstruction mode includes applying bi-directional optical flow to samples for the neighboring block to generate the partial reconstruction of the neighboring block. In some examples, video decoder 30 receives a bitstream including one or more symbols that indicate the partial reconstruction mode includes or applying partial OBMC to samples for the neighboring block such that OBMC has been performed partially but not fully to generate the partial reconstruction of the neighboring block.

Video decoder 30 determines a current block of video data is predicted using a template-based motion vector derivation (804). In some examples, video decoder 30 determines the neighboring block is inter coded when the neighboring block is coded with intra block copy.

Video decoder 30 partially reconstructs the neighboring block (806). For example, video decoder 30 applies motion compensation to motion vector information for the neighboring block to generate a partial reconstruction of the neighboring block without applying bi-directional optical flow or OBMC. In some examples, video decoder 30 applies bi-directional optical flow to samples for the neighboring block to generate the partial reconstruction of the neighboring block without applying OBMC. In some examples, video decoder 30 applies partial OBMC to samples for the neighboring block such that OBMC has been performed partially but not fully to generate the partial reconstruction of the neighboring block. In some examples, video decoder 30 may partially reconstruct the neighboring block using received residual sample values for generating the partial reconstruction of the neighboring block. Again, video decoder 30 may partially reconstruct the neighboring block according to the partial reconstruction mode indicated by symbols in the bitstream output by video encoder 20.

Video decoder 30 filters the partial reconstruction of the neighboring block (808). Although the example of FIG. 20 includes filtering the partial reconstruction of the neighboring block, in some examples, the filtering the partial reconstruction of the neighboring block may be omitted.

Video decoder 30 determines a template for the current block based on the partial reconstruction of the neighboring block (810). For example, video decoder 30 determines the template using template matching based on the partial reconstruction of the neighboring block. In some examples, video decoder 30 determines the template using bilateral matching based on the partial reconstruction of the neighboring block.

Video decoder 30 fully reconstructs the neighboring block (812). For example, video decoder 30 may fully reconstruct the neighboring block by applying motion compensation to the motion vector information for the current block to generate a first set of samples for the current block. In some examples, video decoder 30 may fully reconstruct the neighboring block by applying bi-directional optical flow to the first set of samples for the current block to generate a second set of samples for the current block. In some examples, video decoder 30 may fully reconstruct the neighboring block by applying overlapped block motion compensation to the second set of samples for the current block to generate the predictive block for the current block.

Video decoder 30 determines a reference block in a reference frame corresponding (e.g., best matching) to the template for the current block (814). Video decoder 30 determines motion vector information for the current frame based on the reference block and the template (816). For example, video decoder 30 determines the motion vector information using a displacement between the template and the reference block. Video decoder 30 generates the predictive block for the current block based on the motion vector information (818). Video decoder 30 decodes the current block based on the predictive block (820).

Figure 21:
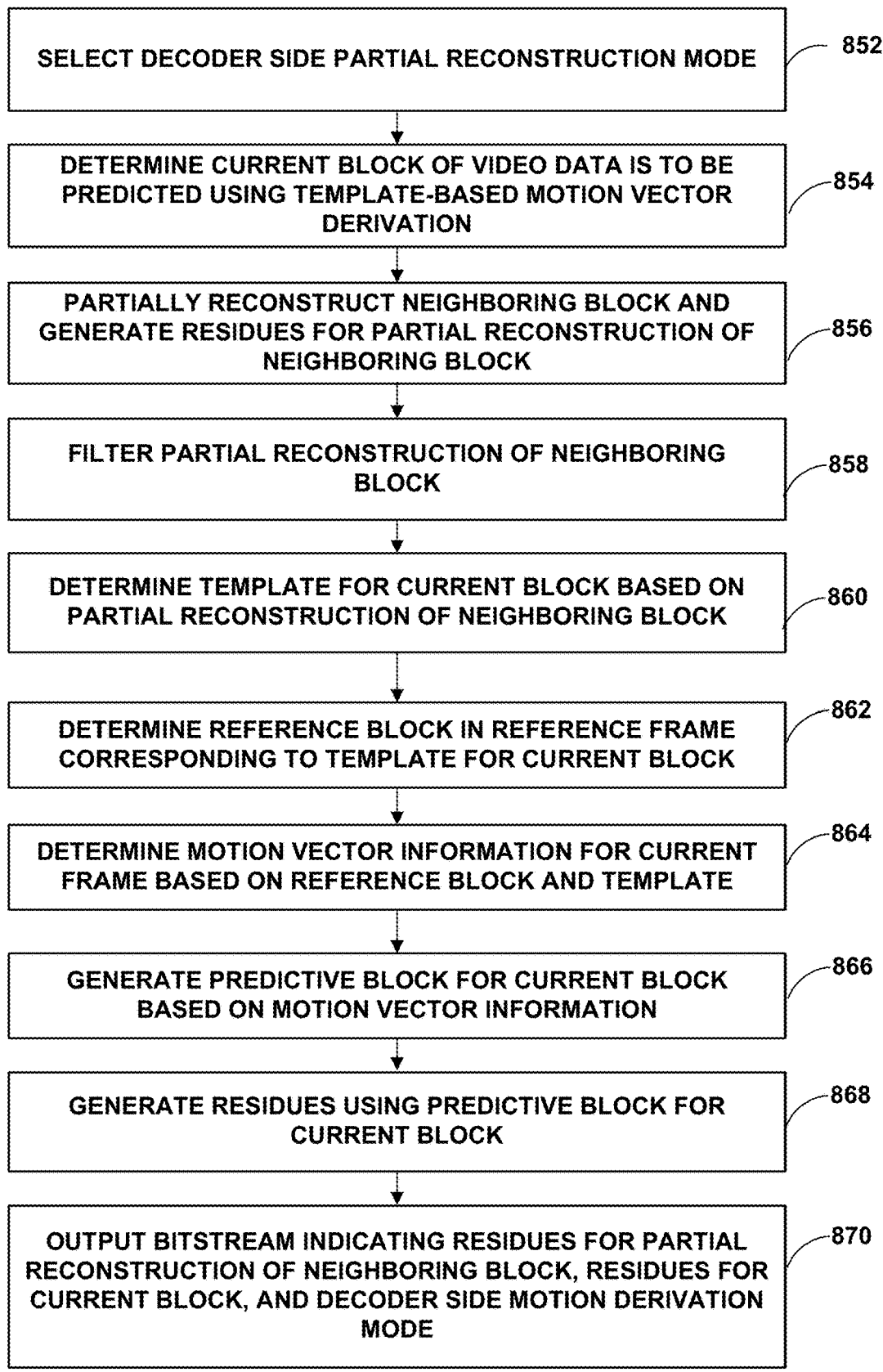
FIG. 21 is a flowchart illustrating an example method of encoding video data in accordance with one or more techniques described in this disclosure.

FIG. 21 is a flowchart illustrating an example method of encoding video data in accordance with one or more techniques described in this disclosure. Initially, video encoder 20 selects a decoder side partial reconstruction mode (852). For example, video encoder 20 selects bilateral matching or template matching using RD cost selection.

The partial reconstruction mode may indicate whether to generate the partial reconstruction of the neighboring block with residual sample values for the neighboring block or without residual sample values for the neighboring block. For example, video encoder 20 selects the partial reconstruction mode to include generating the partial reconstruction of the neighboring block with residual sample values for the neighboring block or generating the partial reconstruction of the neighboring block without residual sample values for the neighboring block using RD cost selection.

The partial reconstruction mode may specify a partial reconstruction of the neighboring block. For example, video encoder 20 selects the partial reconstruction mode to include applying motion compensation to motion vector information for the neighboring block to generate a partial reconstruction of the neighboring block, applying bi-directional optical flow to samples for the neighboring block to generate the partial reconstruction of the neighboring block, or applying partial OBMC to samples for the neighboring block such that OBMC has been performed partially but not fully to generate the partial reconstruction of the neighboring block using RD cost selection.

Video encoder 20 determines a current block of vide data is predicted using template-based motion vector derivation (854). Video encoder 20 partially reconstructs a neighboring block and generates residual sample values for partial reconstruction of the neighboring block (856). Although the example of FIG. 21 includes residual sample values for generating the partial reconstruction of the neighboring block, in some examples, the residual sample values for generating the partial reconstruction of the neighboring block may be omitted.

Video encoder 20 filters the partial reconstruction of the neighboring block (858). Although the example of FIG. 21 includes filtering the partial reconstruction of the neighboring block, in some examples, the filtering the partial reconstruction of the neighboring block may be omitted.

Video encoder 20 determines a template for the current block based on the partial reconstruction of the neighboring block (860). For example, video encoder 20 determines the template using template matching based on the partial reconstruction of the neighboring block. In some examples, video encoder 20 determines the template using bilateral matching based on the partial reconstruction of the neighboring block. For example, video encoder 20 determines the motion vector information using a displacement between the template and the reference block.

Video encoder 20 determines a reference block in a reference frame corresponding (e.g., best matching) to the template for the current block (862). Video encoder 20 determines motion vector information for the current frame based on the reference block and the template (864). Video encoder 20 generates a predictive block for the current block based on the motion vector information (866). Video encoder 20 generates residual sample values using the predictive block for the current block (868). Video encoder 20 outputs a bitstream indicating the residual sample values for partial reconstruction of neighboring block, residual sample values for the current block, and the decoder side motion derivation mode (870).

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining, by a video decoder implemented in processing circuitry, a neighboring block in a current frame is inter coded;
    generating, by the video decoder, a partial reconstruction of the neighboring block before applying overlapped block motion compensation (OBMC) to samples for the neighboring block;
    in response to determining the neighboring block is inter coded, determining, by the video decoder, a template for a current block in the current frame based on the partial reconstruction of the neighboring block;
    after determining the template for the current block, applying, by the video decoder, OBMC to the samples for the neighboring block;
    determining, by the video decoder, a reference block in a reference frame corresponding to the template for the current block, wherein the reference frame is different from the current frame;
    determining, by the video decoder, motion vector information for the current frame based on the reference block and the template;
    generating, by the video decoder, a predictive block for the current block of video data based on the motion vector information; and
    decoding, by the video decoder, the current block of video data based on the predictive block.

2. The method of claim 1, comprising:
    fully reconstructing, by the video decoder, the neighboring block after determining the template for the current block.

3. The method of claim 1, comprising:
    receiving, by the video decoder, an indication of residual sample values for the neighboring block; and
    adding, by the video decoder, the residual sample values to a predictive block for the neighboring block to form the partial reconstruction of the neighboring block.

4. The method of claim 1, comprising:
    applying, by the video decoder, motion compensation to motion vector information for the neighboring block to generate a predictive block for the neighboring block; and
    adding, by the video decoder, residual sample values for the neighboring block to the predictive block for the neighboring block to form the partial reconstruction of the neighboring block.

5. The method of claim 1, comprising:
    applying, by the video decoder, bi-directional optical flow to samples for the neighboring block to generate a predictive block of the neighboring block; and
    adding, by the video decoder, residual sample values for the neighboring block to the predictive block for the neighboring block to form the partial reconstruction of the neighboring block.

6. The method of claim 1, comprising:
    applying, by the video decoder, motion compensation to motion vector information for the neighboring block without adding a residue for the neighboring block to generate the partial reconstruction of the neighboring block.

7. The method of claim 1, comprising:
    applying, by the video decoder, bi-directional optical flow to samples for the neighboring block without adding a residue for the neighboring block to generate the partial reconstruction of the neighboring block.

8. The method of claim 1, comprising:
    determining, by the video decoder, the neighboring block is inter coded when the neighboring block is coded with intra block copy.

9. The method of claim 1, comprising:
    receiving, by the video decoder, in the video data, syntax data specifying a partial reconstruction mode to generate the partial reconstruction of the neighboring block; and
    generating, by the video decoder, the partial reconstruction of the neighboring block using the partial reconstruction mode.

10. The method of claim 1, wherein the neighboring block is a first neighboring block, wherein the current frame is a first current frame, wherein the current block is a first current block, wherein the template is a first template, wherein the reference frame is a first reference frame, wherein the motion vector information is first motion vector information, and wherein the predictive block is a first predictive block, the method further comprising:
    determining, by the video decoder, a second neighboring block in a second current frame is intra coded;
    in response to determining the second neighboring block being intra coded, determining, by the video decoder, a second template for a second current block in the second current frame based on a full reconstruction of the second neighboring block;
    determining, by the video decoder, a second reference block in a second reference frame corresponding to the second template for the second current block, wherein the second reference frame is different from the second current frame;
    determining, by the video decoder, second motion vector information for the second current frame based on the second reference block and the second template;
    generating, by the video decoder, a second predictive block for the second current block of video data based on the second motion vector information; and
    decoding, by the video decoder, the second current block of video data based on the second predictive block.

11. The method of claim 1, wherein determining the template for the current block comprises:
    filtering the partial reconstruction of the neighboring block.

12. The method of claim 1, wherein the template is a first template and wherein determining the first template is for a luma component of the current block, the method further comprising:
    determining a second template for chroma components for the current block based on a full reconstruction of the neighboring block, wherein decoding the current block of video data is further based on the second template.

13. The method of claim 1, wherein the template is a first template and wherein determining the first template is for a first set of samples for the current block, the method further comprising:
    determining a second template for a second set of samples of the current block based on a full reconstruction of the neighboring block, wherein decoding the current block of video data is further based on the second template.

14. The method of claim 1, wherein generating the predictive block comprises:
   applying motion compensation to the motion vector information for the current block to generate a first set of samples for the current block;
   applying bi-directional optical flow to the first set of samples for the current block to generate a second set of samples for the current block; and
   applying overlapped block motion compensation to the second set of samples for the current block to generate the predictive block for the current block.

15. A device for decoding video data, the device comprising:
   a memory configured to store the video data; and
   processing circuitry configured to:
      determine a neighboring block in a current frame is inter coded;
      generate a partial reconstruction of the neighboring block before an application of overlapped block motion compensation (OBMC) to samples for the neighboring block;
      in response to the determination that the neighboring block is inter coded, determine a template for a current block in the current frame based on the partial reconstruction of the neighboring block;
      after the determination of the template for the current block, apply OBMC to the samples for the neighboring block;
      determine a reference block in a reference frame corresponding to the template for the current block, wherein the reference frame is different from the current frame;
      determine motion vector information for the current frame based on the reference block and the template;
      generate a predictive block for the current block of video data based on the motion vector information; and
      decode the current block of video data based on the predictive block.

16. The device of claim 15, wherein the processing circuitry is configured to:
   fully reconstruct the neighboring block after the determination of the template for the current block.

17. The device of claim 15, wherein the processing circuitry is configured to:
   receive an indication of residual sample values for the neighboring block; and
   add the residual sample values to a predictive block for the neighboring block to form the partial reconstruction of the neighboring block.

18. The device of claim 15, wherein the processing circuitry is configured to:
   apply motion compensation to motion vector information for the neighboring block to generate a predictive block for the neighboring block; and
   add residual sample values for the neighboring block to the predictive block for the neighboring block to form the partial reconstruction of the neighboring block.

19. The device of claim 15, wherein the processing circuitry is configured to:
   apply bi-directional optical flow to samples for the neighboring block to generate a predictive block for the neighboring block; and
   add residual sample values for the neighboring block to the predictive block for the neighboring block to form the partial reconstruction of the neighboring block.

20. The device of claim 15, wherein the processing circuitry is configured to:
   apply motion compensation to motion vector information for the neighboring block without an addition of a residue for the neighboring block to generate the partial reconstruction of the neighboring block.

21. The device of claim 15, wherein the processing circuitry is configured to:
   apply bi-directional optical flow to samples for the neighboring block without an addition of a residue for the neighboring block to generate the partial reconstruction of the neighboring block.

22. The device of claim 15, wherein the processing circuitry is configured to:
   determine the neighboring block is inter coded when the neighboring block is coded with intra block copy.

23. The device of claim 15, wherein the processing circuitry is configured to:
   receive, in the video data, syntax data specifying a partial reconstruction mode to generate the partial reconstruction of the neighboring block; and
   generate the partial reconstruction of the neighboring block using the partial reconstruction mode.

24. The device of claim 15, wherein the neighboring block is a first neighboring block, wherein the current frame is a first current frame, wherein the current block is a first current block, wherein the template is a first template, wherein the reference frame is a first reference frame, wherein the motion vector information is first motion vector information, wherein the predictive block is a first predictive block, and wherein the processing circuitry is configured to:
   determine a second neighboring block in a second current frame is intra coded
   in response to the determination that the second neighboring block is intra coded, determine a second template for a second current block in the second current frame based on a full reconstruction of the second neighboring block;
   determine a second reference block in a second reference frame corresponding to the second template for the second current block, wherein the second reference frame is different from the second current frame;
   determine second motion vector information for the second current frame based on the second reference block and the second template;
   generate a second predictive block for the second current block of video data based on the second motion vector information; and
   decode the second current block of video data based on the second predictive block.

25. The device of claim 15, wherein, to determine the template for the current block, the processing circuitry is configured to:
   filter the partial reconstruction of the neighboring block.

26. The device of claim 15,
   wherein the template is a first template,
   wherein the determination of the first template is for a luma component of the current block,
   wherein the processing circuitry is configured to determine a second template for chroma components for the current block based on a full reconstruction of the neighboring block, and wherein, to decode the current block of video data, the processing circuitry is configured to decode the current block of video data further based on the second template.

27. The device of claim 15,
wherein the template is a first template,
wherein the determination of the first template is for a first set of samples for the current block,
wherein the processing circuitry is configured to determine a second template for a second set of samples of the current block based on a full reconstruction of the neighboring block, and
wherein, to decode the current block of video data, the processing circuitry is configured to decode the current block of video data further based on the second template.

28. The device of claim 15, wherein, to generate the predictive block, the processing circuitry is configured to:
apply motion compensation to the motion vector information for the current block to generate a first set of samples for the current block;
apply bi-directional optical flow to the first set of samples for the current block to generate a second set of samples for the current block; and
apply overlapped block motion compensation to the second set of samples for the current block to generate the predictive block for the current block.

29. The device of claim 15, wherein the device comprises a wireless communication device, further comprising a receiver configured to receive encoded video data.

30. The device of claim 29, wherein the wireless communication device comprises a telephone handset and wherein the receiver is configured to demodulate, according to a wireless communication standard, a signal comprising the encoded video data.

31. A method of encoding video data, the method comprising:
determining, by a video encoder implemented in processing circuitry, a neighboring block in a current frame is inter coded;
generating, by the video encoder, a partial reconstruction of the neighboring block before applying overlapped block motion compensation (OBMC) to samples for the neighboring block;
in response to determining the neighboring block is inter coded, determining, by the video encoder, a template for a current block in the current frame based on the partial reconstruction of the neighboring block;
after determining the template for the current block, applying, by the video encoder, OBMC to the samples for the neighboring block;
determining, by the video encoder, a reference block in a reference frame corresponding to the template for the current block, wherein the reference frame is different from the current frame;
determining, by the video encoder, motion vector information for the current frame based on the reference block and the template;
generating, by the video encoder, a predictive block for the current block of video data based on the motion vector information; and
generating, by the video encoder, residual sample values for the current block of video data based on the predictive block.

32. A device for encoding video data, the device comprising:
a memory configured to store the video data; and
processing circuitry configured to:
determine a neighboring block in a current frame is inter coded;
generate a partial reconstruction of the neighboring block before an application of overlapped block motion compensation (OBMC) to samples for the neighboring block;
in response to the determination that the neighboring block is inter coded, determine a template for a current block in the current frame based on the partial reconstruction of the neighboring block;
after the determination of the template for the current block, apply OBMC to the samples for the neighboring block;
determine a reference block in a reference frame corresponding to the template for the current block, wherein the reference frame is different from the current frame;
determine motion vector information for the current frame based on the reference block and the template;
generate a predictive block for the current block of video data based on the motion vector information; and
generate residual sample values for the current block of video data based on the predictive block.

33. The device of claim 32, wherein the device comprises a wireless communication device, further comprising a transmitter configured to transmit encoded video data.

34. The device of claim 33, wherein the wireless communication device comprises a telephone handset and wherein the transmitter is configured to modulate, according to a wireless communication standard, a signal comprising the encoded video data.

\* \* \* \* \*